(12) United States Patent
Uhr et al.

(10) Patent No.: US 10,848,318 B2
(45) Date of Patent: Nov. 24, 2020

(54) SYSTEM FOR AUTHENTICATING CERTIFICATE BASED ON BLOCKCHAIN NETWORK, AND METHOD FOR AUTHENTICATING CERTIFICATE BASED ON BLOCKCHAIN NETWORK BY USING SAME

(71) Applicant: Coinplug, Inc., Seongnam-si (KR)

(72) Inventors: Joon Sun Uhr, Seongnam-si (KR); Jay Wu Hong, Seoul (KR); Joo Han Song, Seongnam-si (KR)

(73) Assignee: COINPLUG, INC., Seongnam (KR)

( * ) Notice: Subject to any disclaimer, the term of this patent is extended or adjusted under 35 U.S.C. 154(b) by 226 days.

(21) Appl. No.: 16/191,480

(22) Filed: Nov. 15, 2018

(65) Prior Publication Data

US 2019/0081799 A1    Mar. 14, 2019

Related U.S. Application Data

(63) Continuation of application No. 16/008,359, filed on Jun. 14, 2018, now Pat. No. 10,164,779, which is a
(Continued)

(30) Foreign Application Priority Data

Mar. 30, 2016    (KR) .......................... 10-2016-0038068

(51) Int. Cl.
*H04L 9/32* (2006.01)
*G06Q 20/38* (2012.01)
(Continued)

(52) U.S. Cl.
CPC .......... *H04L 9/3265* (2013.01); *G06F 16/137* (2019.01); *G06F 16/2246* (2019.01);
(Continued)

(58) Field of Classification Search
CPC ............... G06F 16/137; G06F 16/2246; G06F 21/33–335; G06F 21/45; G06Q 20/38;
(Continued)

(56) References Cited

U.S. PATENT DOCUMENTS

2015/0206106 A1* 7/2015 Yago .................. G06Q 20/0655
705/68
2016/0342977 A1* 11/2016 Lam .................... G06Q 20/0658
(Continued)

FOREIGN PATENT DOCUMENTS

JP    2013-020312 A    1/2013
KR   10-0411448 B1    12/2003
(Continued)

OTHER PUBLICATIONS

Bitcoin Technology, Used for Issuing Certificate, Bloter.net, Sep. 19, 2014, pp. 1-3, http://www.bloter.net/archives/207040>.

*Primary Examiner* — Kevin Bechtel
(74) *Attorney, Agent, or Firm* — Xsensus LLP

(57) ABSTRACT

A method for authenticating a specific user by using certificates including a specific certificate of the specific user based on a blockchain network is provided. The method includes steps of: an authentication-supporting server, (a) on condition that a transaction is stored in a distributed database on the blockchain network from when a previous anchoring condition is satisfied to when a current anchoring condition is satisfied, wherein the transaction includes a root hash value created by a Merkle tree operation to leaf nodes having hash values of the certificates and the certificates including public keys of users, root hash identification information, and a transaction ID for locating the transaction on the distributed database are stored in the authentication-supporting server as corresponding to the specific user, if authentication of the specific user is requested, confirming validity
(Continued)

of the specific certificate; and (b) if the specific certificate is valid, authenticating the specific user.

24 Claims, 16 Drawing Sheets

Related U.S. Application Data continuation of application No. PCT/KR2016/011293, filed on Oct. 10, 2016.

(51) Int. Cl.
*G06F 21/45* (2013.01)
*G06F 21/33* (2013.01)
*H04L 9/08* (2006.01)
*H04L 9/06* (2006.01)
*G06F 16/13* (2019.01)
*G06F 16/22* (2019.01)
*H04L 29/06* (2006.01)

(52) U.S. Cl.
CPC .............. *G06F 21/33* (2013.01); *G06F 21/45* (2013.01); *G06Q 20/38* (2013.01); *G06Q 20/3829* (2013.01); *G06Q 20/38215* (2013.01); *H04L 9/0637* (2013.01); *H04L 9/0643* (2013.01); *H04L 9/0861* (2013.01); *H04L 9/32* (2013.01); *H04L 9/3239* (2013.01); *H04L 63/0823* (2013.01); *G06Q 2220/00* (2013.01); *H04L 2209/38* (2013.01)

(58) Field of Classification Search
CPC ......... G06Q 20/38215; G06Q 20/3829; G06Q 2220/00; H04L 9/0861; H04L 9/0637; H04L 9/0643; H04L 9/0825; H04L 9/32; H04L 9/3236; H04L 9/3239; H04L 9/3263–3268; H04L 63/0823; H04L 2209/38

See application file for complete search history.

(56) References Cited

U.S. PATENT DOCUMENTS

2017/0078299 A1* 3/2017 Castinado ............... H04L 63/08
2019/0140849 A1* 5/2019 Kravitz ................. H04L 9/0819

FOREIGN PATENT DOCUMENTS

| KR | 10-0870202 B1 | 12/2008 |
| KR | 10-2013-0019498 A | 2/2013 |
| KR | 10-2015-0144645 A | 12/2015 |
| KR | 10-1661930 B1 | 10/2016 |

* cited by examiner

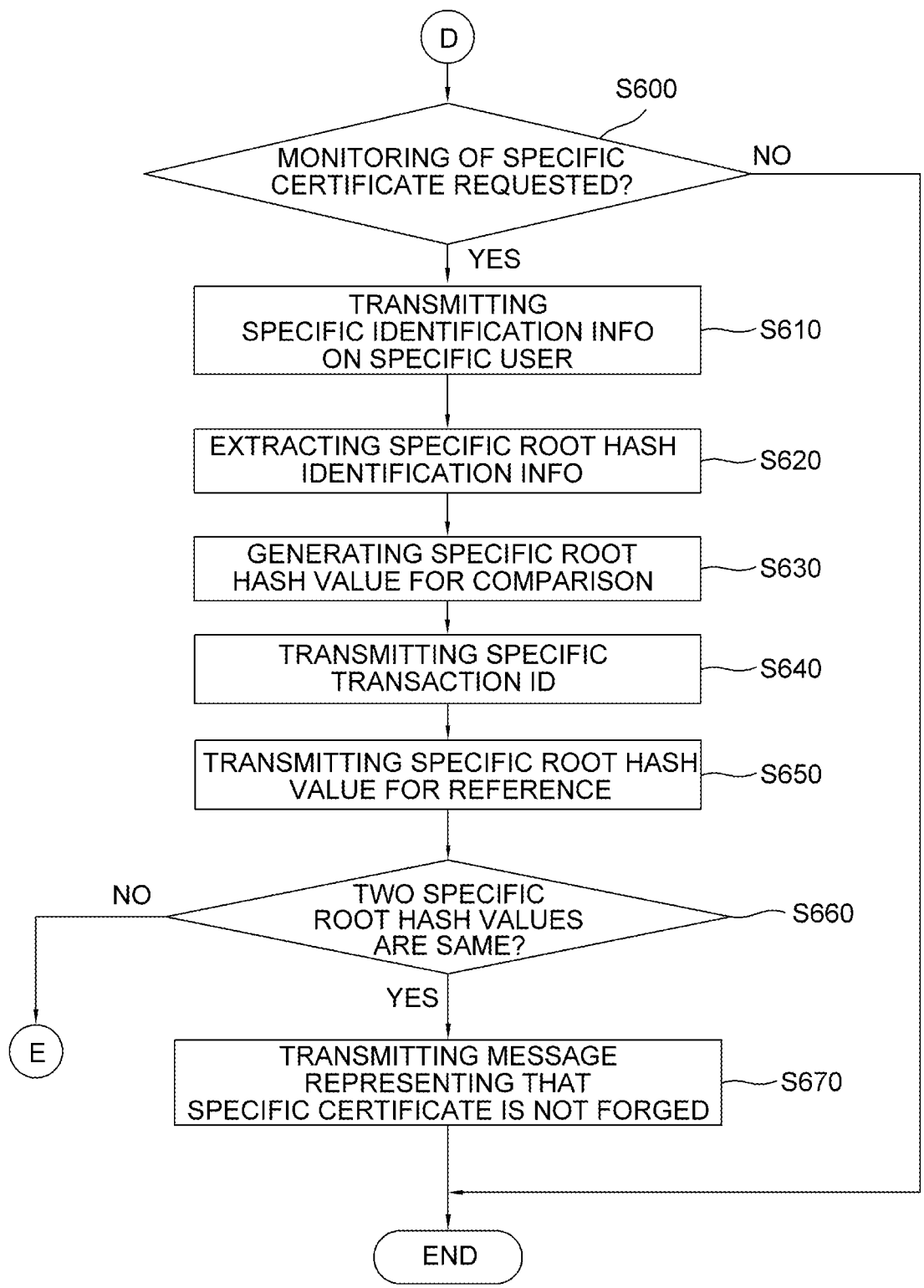

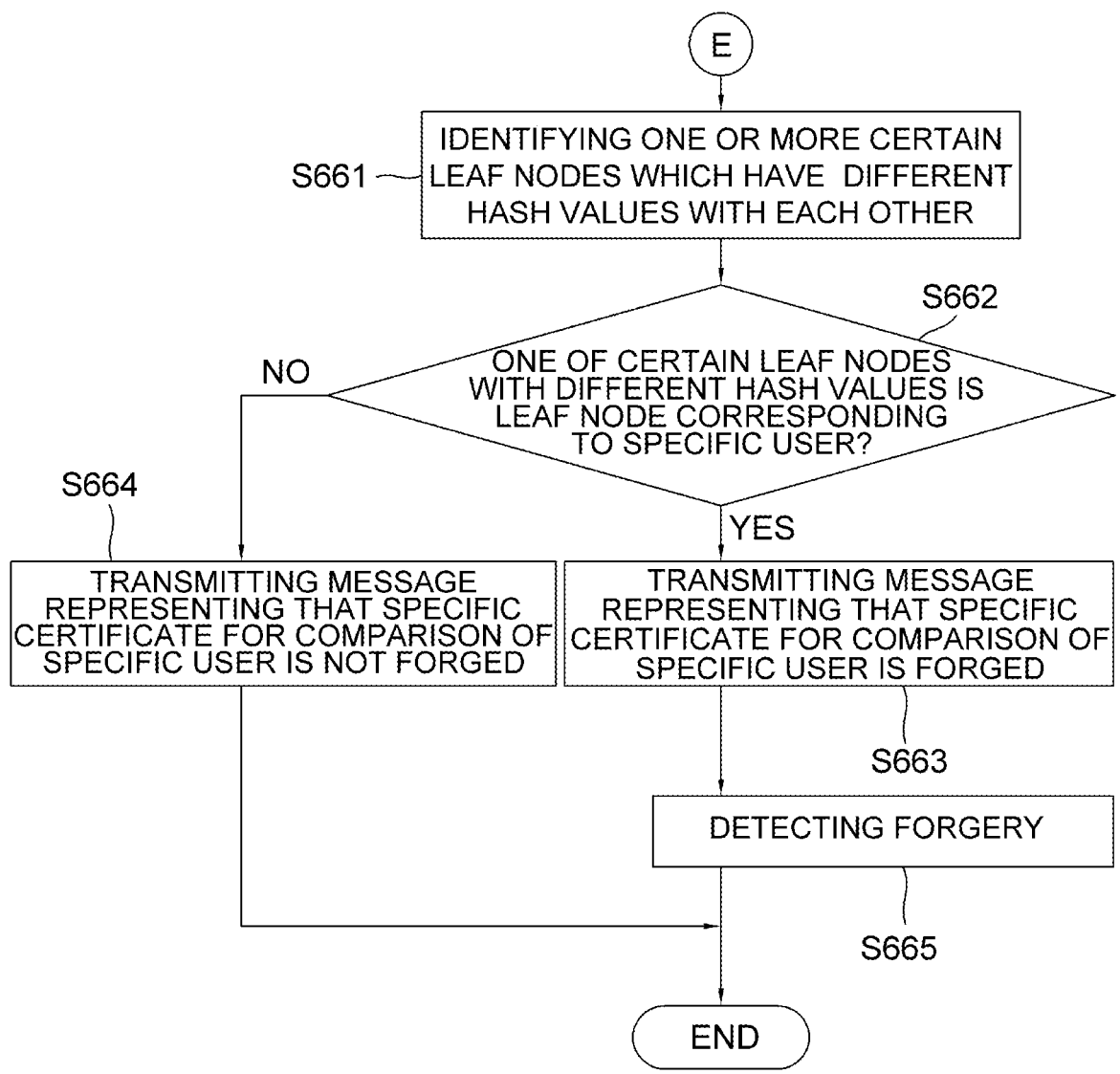

SYSTEM FOR AUTHENTICATING CERTIFICATE BASED ON BLOCKCHAIN NETWORK, AND METHOD FOR AUTHENTICATING CERTIFICATE BASED ON BLOCKCHAIN NETWORK BY USING SAME

CROSS-REFERENCE TO RELATED APPLICATIONS

This application is a continuation of U.S. patent application Ser. No. 16/008,359, filed on Jun. 14, 2016, which is a National Stage Entry of International Patent Application No. PCT/KR2016/011293, filed on Oct. 10, 2016, and claims priority to Korean Patent Application 10-2016-0038068, filed on Mar. 30, 2016, the entire contents of each of which being incorporated herein by reference.

FIELD OF THE INVENTION

The present disclosure relates to a method for authenticating a specific user by using certificates including a specific certificate of the specific user based on a blockchain network; and more particularly, to the method of, (a) on condition that a specific transaction is stored in a distributed database on the blockchain network from when a previous anchoring condition for registering transactions in the blockchain network is satisfied to when one of current anchoring conditions for registering transactions in the blockchain network is satisfied, wherein the specific transaction includes a specific root hash value for reference created by applying a Merkle tree operation to each of leaf nodes having each of hash values for reference of each of the certificates and on condition that each of the certificates including each of public keys of each of users including the corresponding to the specific root hash value for reference, and a specific transaction ID representing a location of the specific transaction on the distributed database are stored in the authentication-supporting server as corresponding to specific identification information on the specific user, if an authentication request of the specific user including the specific identification information on the specific user is acquired from a specific user device, confirming a validity of the specific certificate of the specific user stored as corresponding to the specific identification information on the specific user; and (b) if the specific certificate is determined as valid, performing an authentication of the specific user by using the specific certificate, and the authentication-supporting server using the same.

BACKGROUND OF THE INVENTION

In general, a certificate is electronic information issued by a certificate authority (CA) for the purpose of confirming an identity of a user, and preventing transaction denials or forgery and falsification of a document upon the use of services in the various industrial fields, representing a kind of certificate of seal impression for a digital transaction. Such a certificate contains a version, a serial number, an effective period, an issuing institution of the certificate, information on verification of an electronic signature of a user, a name of the user, in formation on identification confirmation, an electronic signing method, etc.

The certificate is used (refer to Cited Patent Literature 1) in a public key infrastructure (PKI) as a standard security method.

The PKI is a set of roles, policies, and procedures needed to create, manage, distribute, use, store, and revoke certificates and manage public key encryption.

However, in the PKI, the private key used for decryption is generated and provided by the CA who is just a third party, not the user, therefore it is open to hacking, and as the user's private key exists in the form of a file at a storing location standardized by a soft token-based storing method, it is easy to copy and collect automatically the private key file and this has a risk of financial damages and user information theft caused by a leaked private key. Therefore, the CA who provides the generated private key to the user must have a certificate issuing system with a strong security to minimize hacking attempts, which requires operation and maintenance and thus causes a high cost of the issuance.

In addition, the certificate can be used only when ActiveX controls are installed in advance, for the purpose of additional security for the user authentication process through a web browser. However, to install the ActiveX controls on a personal computer (PC), a security level of the PC must be lowered for the ActiveX controls to access resources including files, registry, etc. Due to the lowered security level of the user's PC caused by the Active X controls, the PC becomes vulnerable to the dangerous environment such as hacking.

Each of the problems associated with the certificate is resolved by the certificate issuance system based on the blockchain (refer to Cited Patent Literature 2), and a method using the same, and by the certificate authenticating system based on the blockchain and a method using the same, from the applicant.

The conventional certificate issuance system based on the blockchain and the method using the same, and the conventional certificate authentication system based on the blockchain and the method using the same disclose a method for directly generating a public key and a private key for the certificate within a user device operated by a user, the user device generating the public and private keys while the network is disconnected, preventing possible leakage of the keys by storing and managing the private key encrypted together with a photo image and a password selected by the user, where the public key, which requires constant maintenance, is stored and managed in the blockchain of the digital wallet in the blockchain server by using a distributed database based on a peer-to-peer network (P2P), not a server managed by the CA, thus, an additional cost is minimized which is required for maintenance of the certificate issuance system with the strong security against hacking, and performing authentication even without the ActiveX controls.

Despite these advantages, a conventional certificate issuance system and method based on blockchain, and a conventional certificate authentication system and method based on the blockchain require an initial cost of issuance for storing and managing of the public key for the certificate need for the authentication of the certificate.

The initial cost is about 0.0001 bitcoin, and as of July 2015, 0.0001 bitcoin amounts to about mere 4 cents, however, this cost is charged every time the certificate based on the blockchain is issued, thus this becomes a problem as the cost of the issuance increases in proportion to the increase of the issuance.

Additionally, the conventional certificate issuance system and method and the conventional certificate authentication system and method register, store, and manage the public key in more than 0.1 million blockchain nodes to prevent forgery of the public key.

That is, the broadcast of the transaction information including the public key is defined by a protocol, and if the transaction information including the public key occurs, one node, i.e., a block-chain node, broadcasts initial transaction information including the public key to eight designated nodes, then each of the eight designated nodes that received the information broadcasts again to another eight designated nodes in a pyramidic fashion, and the broadcast is completed when the information is transmitted to all of the blockchain nodes which have the digital wallets containing the blockchain required for bitcoin payment.

Due to these reasons, the conventional certificate issuance system and method and the conventional certificate authentication system and method have a risk of network overload caused by traffic of transaction information including the public keys when requests for registering the public keys rush in, and exposure of the public keys because the transaction information including the public keys stored in the blockchain nodes is open to public.

PRIOR ART

Cited Patent Literature

Cited Patent Literature 1: Korean Patent Publication No. 10-0411448 registered on Dec. 3, 2003
Cited Patent Literature 2: Korean Patent Laid-Open Publication No. 10-1661930 filed on Aug. 3, 2015

SUMMARY OF THE INVENTION

It is an object of the present disclosure to solve all the aforementioned problems.

It is another object of the present disclosure to provide a certificate issuance system based on a blockchain network and a certificate issuance method based on the blockchain network using the same by eliminating a constructing cost, a cost to construct a system for issuing a certificate linked with top-grade security system to block hacking as much as possible, due to the fact that a public key for the certificate, which requires maintenance, is saved and managed on a blockchain network through a peer-to-peer (P2P) network based distributed database instead of being saved and managed on a certificate authority (CA) operating server, eliminating system-related costs such as operating and maintaining cost of the constructed system for issuing the certificate based on the blockchain network, and greatly reducing an issuing cost when issuing the certificate.

It is still another object of the present disclosure to provide the certificate issuance system based on the blockchain network and the certificate issuance method based on the blockchain network using the same by grouping users' public keys for the certificate as many as the predetermined number, compressing the grouped public keys, and registering transaction information that includes the grouped public keys list in order to minimize the network traffics, to thereby also minimize the network overload while registering the transaction information in the blockchain network in the process of issuing the certificate.

It is still yet another object of the present disclosure to provide the certificate issuance system based on the blockchain network and the certificate issuance method based on the blockchain network using the same capable of performing an authentication process, when issuing the certificate, of the certificate without registering the users' public keys in the blockchain network, and monitoring forgery and falsification of authentication related information that includes the public key of the user.

In accordance with one aspect of the present disclosure, there is provided a method for authenticating a specific user by using certificates including a specific certificate of the specific user based on a blockchain network, including steps of: (a) an authentication-supporting server, on condition that a specific transaction is stored in a distributed database on the blockchain network from when a previous anchoring condition for registering transactions in the blockchain network is satisfied to when one of current anchoring conditions for registering transactions in the blockchain network is satisfied, wherein the specific transaction includes a specific root hash value for reference created by applying a Merkle tree operation to each of leaf nodes having each of hash values for reference of each of the certificates and on condition that each of the certificates including each of public keys of each of users including the specific user, specific root hash identification information corresponding to the specific root hash value for reference, and a specific transaction ID representing a location of the specific transaction on the distributed database are stored in the authentication-supporting server as corresponding to specific identification information on the specific user, if an authentication request of the specific user including the specific identification information on the specific user is acquired from a specific user device, confirming a validity of the specific certificate of the specific user stored as corresponding to the specific identification information on the specific user; and (b) the authentication-supporting server, if the specific certificate is determined as valid, performing an authentication of the specific user by using the specific certificate.

As one example, at the step of (a), the authentication-supporting server (i) confirms the specific root hash identification information corresponding to the specific identification information on the specific user, (ii) generates a specific root hash value for comparison, corresponding to the specific root hash identification information, by applying the Merkle free operation to each of the leaf nodes including each of hash values for comparison of the certificates, (iii) confirms the specific transaction ID corresponding to the specific root hash identification information, (iv) retrieves the specific transaction from the distributed database by referring to the specific transaction ID and extracts the specific root hash value for reference from the specific transaction, and (v) determines whether the specific root hash value for comparison and the specific root hash value for reference are identical, to thereby confirm whether the specific certificate is valid.

As one example, the authentication-supporting server, if the specific root hash value for comparison and the specific roof hash value for reference are determined as not identical, compares (i) a specific hash value for reference in a specific leaf node which is a descendant of a root node including the specific root hash value for reference corresponding to the specific user, and (ii) a specific hash value for comparison in the specific leaf node which is a descendant of a root node including the specific root hash value for comparison, to thereby confirm whether the specific certificate is valid.

As one example, the authentication-supporting server, before confirming the specific root hash identification information corresponding to the specific identification information on the specific user, (i) generates a specific hash value for comparison by hashing the specific certificate corresponding to the specific identification information on the specific user, and (ii) determines whether a specific hash value for reference of the specific certificate corresponding to the specific identification information on the specific user is identical to the specific hash value for comparison, to thereby confirm whether the specific certificate is valid.

As one example, at the step of (b), if a communication protocol between the authentication-supporting server and the specific user device is an HTTP, the authentication-supporting server (i) generates a random session key, (ii) encrypts the random session key using a public key of the specific user included in the specific certificate to thereby generate an encrypted random session key, and (iii) transmits the encrypted random session key to the specific user device, to thereby instruct the specific user device to decrypt the encrypted random session key by using a private key of the specific user stored in the specific user device to perform the authentication of the specific user.

As one example, at the step of (b), if a communication protocol between the authentication-supporting server and the specific user device is an HTTPS, the authentication-supporting server (i) generates nonce data and transmit the nonce data to the specific user device, (ii) instructs the specific user device to (ii-1) hash the nonce data to thereby generate nonce data hash information for reference, (ii-2) generate encrypted nonce data hash information for reference by using a private key of the specific user stored in the specific user device, and (ii-3) transmit the encrypted nonce data hash information for reference to the authentication-supporting server, (iii) decrypts the encrypted nonce data hash information for reference by using a public hey of the specific user included in the specific certificate, to thereby acquire the nonce data hash information for reference, and (iv) determines whether the nonce data hash information for reference is identical to nonce data hash information for comparison created by hashing the nonce data, to thereby confirm whether the specific user is authenticated.

In accordance with another aspect of the present disclosure, there is provided a method for authenticating a specific user by using certificates including a specific certificate of the specific user based on a blockchain network, including steps of: (a) a certificate-managing server, on condition that a specific transaction is stored in a distributed database on the blockchain network from when a previous anchoring condition for registering transactions in the blockchain network is satisfied to when one of current anchoring conditions for registering transactions in the blockchain network is satisfied, wherein the specific transaction includes a specific root hash value for reference created by applying a Merkle tree operation to each of leaf nodes having each of hash values for reference of each of the certificates and on condition that each of the certificates including each of public keys of each of users including the specific user, specific root hash identification information corresponding to the specific root hash value for reference, and a specific transaction ID representing a location of the specific transaction on the distributed database are stored in the certificate-managing server as corresponding to specific identification information on the specific user, if an authentication request of the specific user including the specific identification information on the specific user is acquired from an authentication-requesting server, confirming a validity of the specific certificate of the specific user stored as corresponding to the specific identification information on the specific user; and (b) the certificate-managing server, if the specific certificate is determined as valid, transmitting the specific certificate to the authentication-requesting server, to thereby instruct the authentication-requesting server to perform an authentication of the specific user by using the specific certificate.

As one example, at the step of (a), the certificate-managing server (i) confirms the specific root hash identification information corresponding to the specific identification information on the specific user, (ii) generates a specific root hash value for comparison, corresponding to the specific root hash identification information, by applying the Merkle tree operation to each of the leaf nodes including each of hash values for comparison of the certificates, (iii) confirms the specific transaction ID corresponding to the specific root hash identification information, (iv) retrieves the specific transaction from the distributed database by referring to the specific transaction ID and extracts the specific root hash value for reference from the specific transaction, and (v) determines whether the specific root hash value for comparison and the specific root hash value for reference are identical, to thereby confirm whether the specific certificate is valid.

As one example, the certificate-managing server, if the specific root hash value for comparison and the specific root hash value for reference are determined as not identical, compares (i) a specific hash value for reference in a specific leaf node which is a descendant of a root node including the specific root hash value for reference corresponding to the specific user, and (ii) a specific hash value for comparison in the specific leaf node which is a descendant of a root node including the specific root hash value for comparison, to thereby confirm whether the specific certificate is valid.

As one example, the certificate-managing server, before confirming the specific root hash identification information corresponding to the specific identification information on the specific user, (i) generates a specific hash value for comparison by hashing the specific certificate corresponding to the specific identification information on the specific user, and (ii) determines whether a specific hash value for reference of the specific certificate corresponding to the specific identification information on the specific user is identical to the specific hash value for comparison, to thereby confirm whether the specific certificate is valid.

As one example, at the step of (b), the certificate-managing server transmits the specific certificate to the authentication-requesting server, to thereby instruct the authentication-requesting server, if a communication protocol between the authentication-supporting server and the specific user device is an HTTP, (i) to generate a random session key, (ii) to encrypt the random session key using a public key of the specific user included in the specific certificate to thereby generate an encrypted random session key, and (iii) to transmit the encrypted random session key to the specific user device, to thereby instruct the specific user device (iii-1) to decrypt the encrypted random session key by using a private key of the specific user stored in the specific user device to perform the authentication of the specific user.

As one example, at the step of (b), the certificate-managing server transmits the specific certificate to the authentication-requesting server, to thereby instruct the authentication-requesting server, if a communication protocol between the authentication-requesting server and the specific user device is an HTTPS, (i) to generate nonce data and transmit the nonce data to the specific user device, (ii) to instruct the specific user device to (ii-1) hash the nonce data to thereby generate nonce data hash information for reference, (ii-2) generate encrypted nonce data hash information for reference by using a private key of the specific user stored in the specific user device, and (ii-3) transmit the encrypted nonce data hash information for reference to the authentication-supporting server, (iii) to decrypt the encrypted nonce data hash information for reference by using a public key of the specific user included in the specific certificate, to thereby acquire the nonce data hash information for reference, and (iv) determines whether the nonce data hash information for reference is identical to nonce data hash information for comparison created by hashing the nonce data, to thereby confirm whether the specific user is authenticated.

In accordance with still another aspect of the present disclosure, there is provided an authentication-supporting server for authenticating a specific user by using certificates including a specific certificate of the specific user based on a blockchain network, including: a communication part, on condition that a specific transaction is stored in a distributed database on the blockchain network from when a previous anchoring condition for registering transactions in the blockchain network is satisfied to when one of current anchoring conditions for registering transactions in the blockchain network is satisfied, wherein the specific transaction includes a specific root hash value for reference created by applying a Merkle tree operation to each of leaf nodes having each of hash values for reference of each of the certificates and on condition that each of the certificates including each of public keys of each of users including the specific user, specific root hash identification information corresponding to the specific root hash value for reference, and a specific transaction ID representing a location of the specific transaction on the distributed database are stored in the authentication-supporting server as corresponding to specific identification information on the specific user, for acquiring an authentication request of the specific user including the specific identification information on the specific user from a specific user device; and a processor for (I) confirming a validity of the specific certificate of the specific user stored as corresponding to the specific identification information on the specific user, and (II) performing, if the specific certificate is determined as valid, certificate.

As one example, at the process of (I), the processor (i) confirms the specific root hash identification information corresponding to the specific identification information on the specific user, (ii) generates a specific root hash value for comparison, corresponding to the specific root hash identification information, by applying the Merkle tree operation to each of the leaf nodes including each of hash values for comparison of the certificates, (iii) confirms the specific transaction ID corresponding to the specific root hash identification information, (iv) retrieves the specific transaction from the distributed database by referring to the specific transaction ID and extracts the specific root hash value for reference from the specific transaction, and (v) determines whether the specific root hash value for comparison and the specific root hash value for reference are identical, to thereby confirm whether the specific certificate is valid.

As one example, the processor, if the specific root hash value for comparison and the specific root hash value for reference are determined as not identical, compares (i) a specific hash value for reference in a specific leaf node which is a descendant of a root node including the specific root hash value for reference corresponding to the specific user, and (ii) a specific hash value for comparison in the specific leaf node which is a descendant of a root node including the specific root hash value for comparison, to thereby confirm whether the specific certificate is valid.

As one example, the processor, before confirming the specific root hash identification information corresponding to the specific identification information on the specific user, (i) generates a specific hash value for comparison by hashing the specific certificate corresponding to the specific identification information on the specific user, and (ii) determines whether a specific hash value for reference of the specific certificate corresponding to the specific identification information on the specific user is identical to the specific hash value for comparison, to thereby confirm whether the specific certificate is valid.

As one example, at the process of (II), if a communication protocol between the authentication-supporting server and the specific user device is an HTTP, the processor (i) generates a random session key, (ii) encrypts the random session key using a public key of the specific user included in the specific certificate to thereby generate an encrypted random session key, and (iii) transmits the encrypted random session key to the specific user device, to thereby instruct the specific user device to decrypt the encrypted random session key by using a private key of the specific user stored in the specific user device to perform the authentication of the specific user.

As one example, at the process of (II), if a communication protocol between the authentication-supporting server and the specific user device is an HTTPS, the processor (i) generates nonce data and transmit the nonce data to the specific user device, (ii) instructs the specific user device to (ii-1) hash the nonce data to thereby generate nonce data hash information for reference, (ii-2) generate encrypted nonce data hash information for reference by using a private key of the specific user stored in the specific user device, and (ii-3) transmit the encrypted nonce data hash information for reference to the authentication-supporting server, (iii) decrypts the encrypted nonce data hash information for reference by using a public key of the specific user included in the specific certificate, to thereby acquire the nonce data hash information for reference, and (iv) determines whether the nonce data hash information for reference is identical to nonce data hash information for comparison created by hashing the nonce data, to thereby confirm whether the specific user is authenticated.

In accordance with still yet another aspect of the present disclosure, there is provided a certificate-managing server for authenticating a specific user by using certificates including a specific certificate of the specific user based on a blockchain network, including a communication part, on condition that a specific transaction is stored in a distributed database on the blockchain network from when a previous anchoring condition for registering transactions in the blockchain network is satisfied to when one of current anchoring conditions for registering transactions in the blockchain network is satisfied, wherein the specific transaction includes a specific root hash value for reference created by applying a Merkle tree operation to each of leaf nodes having each of hash values for reference of each of the certificates and on condition that each of the certificates including each of public keys of each of users including the specific user, specific root hash identification information corresponding to the specific root hash value for reference, and a specific transaction ID representing a location of the specific transaction on the distributed database are stored in the certificate-managing server as corresponding to specific identification information on the specific user, for acquiring an authentication request of the specific user including the specific identification information on the specific user from an authentication-requesting server; and a processor for (I) confirming a validity of the specific certificate of the specific user stored as corresponding to the specific identification information on the specific user, and (II) transmitting, if the specific certificate is determined as valid, the specific certificate to the authentication-requesting server, to thereby instruct the authentication-requesting server to perform an authentication of the specific user by using the specific certificate.

As one example, at the process of (I), the processor (i) confirms the specific root hash identification information corresponding to the specific identification information on the specific user, (ii) generates a specific root hash value for comparison, corresponding to the specific root hash identification information, by applying the Merkle tree operation to each of the leaf nodes including each of hash values for comparison of the certificates, (iii) confirms the specific transaction ID corresponding to the specific root hash identification information, (iv) retrieves the specific transaction from the distributed database by referring to the specific transaction ID and extracts the specific root hash value for reference from the specific transaction, and (v) determines whether the specific root hash value for comparison and the specific root hash value for reference are identical, to thereby confirm whether the specific certificate is valid.

As one example, the processor, if the specific root hash value for comparison and the specific root hash value for reference are determined as not identical, compares (i) a specific hash value for reference in a specific leaf node which is a descendant of a root node including the specific root hash value for reference corresponding to the specific user, and (ii) a specific hash value for comparison in the specific leaf node which is a descendant of a root node including the specific root hash value for comparison, to thereby confirm whether the specific certificate is valid.

As one example, the processor, before confirming the specific root hash identification information corresponding to the specific identification information on the specific user, (i) generates a specific hash value for comparison by hashing the specific certificate corresponding to the specific identification information on the specific user, and (ii) determines whether a specific hash value for reference of the specific certificate corresponding to the specific identification information on the specific user is identical to the specific hash value for comparison, to thereby confirm whether the specific certificate is valid.

As one example, at the process of (II), the processor transmits the specific certificate to the authentication-requesting server, to thereby instruct the authentication-requesting server, if a communication protocol between the authentication-supporting server and the specific user device is an HTTP, (i) to generate a random session key, (ii) to encrypt the random session key using a public key of the specific user included in the specific certificate to thereby generate an encrypted random session key, and (iii) to transmit the encrypted random session key to the specific user device, to thereby instruct the specific user device (iii-1) to decrypt the encrypted random session key by using a private key of the specific user stored in the specific user device to perform the authentication of the specific user.

As one example, at the process of (II), the processor transmits the specific certificate to the authentication-requesting server, to thereby instruct the authentication-requesting server, if a communication protocol between the authentication-requesting server and the specific user device is an HTTPS, (i) to generate nonce data and transmit the nonce data to the specific user device, (ii) to instruct the specific user device to (ii-1) hash the nonce data to thereby generate nonce at a hash information for reference, (ii-2) generate encrypted nonce data hash information for reference by using a private key of the specific user stored in the specific user device, and (ii-3) transmit the encrypted nonce data hash information for reference to the authentication-supporting server, (iii) to decrypt the encrypted nonce data hash information for reference by using a public key of the specific user included in the specific certificate, to thereby acquire the nonce data hash information for reference, and (iv) determines whether the nonce data hash information for reference is identical to nonce data hash information for comparison created by hashing the nonce data, to thereby confirm whether the specific user is authenticated.

BRIEF DESCRIPTION OF THE DRAWINGS

The above and other objects and features of the present disclosure will become apparent from the following description of preferred embodiments given in conjunction with the accompanying drawings, in which:

FIGS. 11 to 16 are flow charts schematically illustrating a process of authenticating the specific certificate by using the system for authenticating the specific certificate based on the blockchain network in accordance with one example embodiment of the present disclosure.

DETAILED DESCRIPTION OF THE PREFERRED EMBODIMENTS

Figure 1:
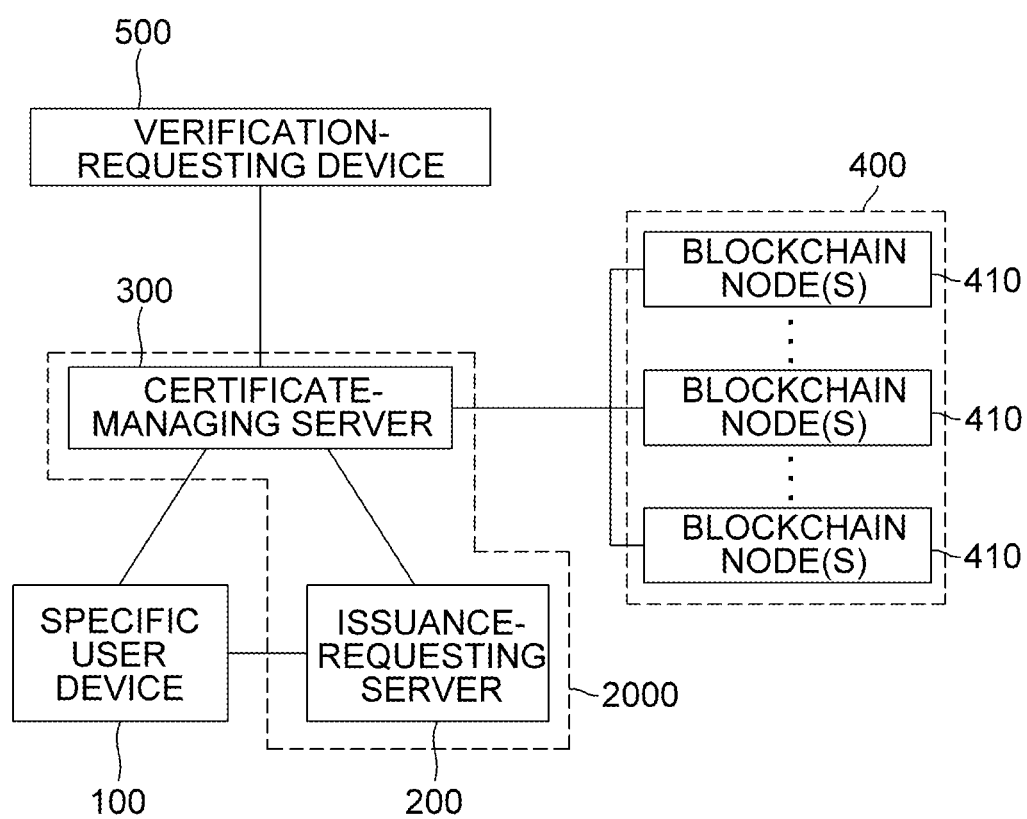
FIG. 1 is a block diagram schematically illustrating a system for issuing a specific certificate based on a blockchain network in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Throughout the present disclosure, every processor, every memory, every storage, or any other computing components are described as separate components, however, said every processor, said every memory, said every storage, or said any other computing components may be configured as a single device or any other combinations thereof.

Also, throughout the present disclosure, a temporal order of acquiring, comparing, determining, extracting, generating, hashing, processing, retrieving, storing, or transmitting 'something for reference' and 'something for comparison' is not limited.

The present disclosure includes part for issuance and part for authentication of a specific certificate based on a blockchain network.

Figure 2:
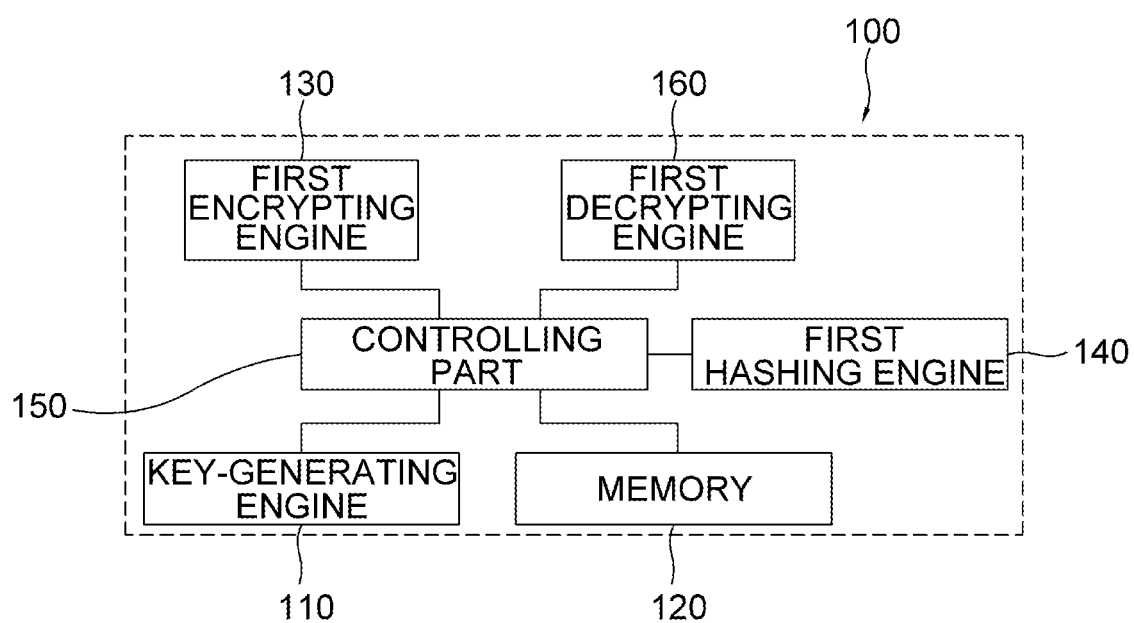
FIG. 2 is a block diagram schematically illustrating a detailed configuration of a specific user device of the system for issuing the specific certificate based on the blockchain network in accordance with one example embodiment of the present disclosure.
Figure 3:
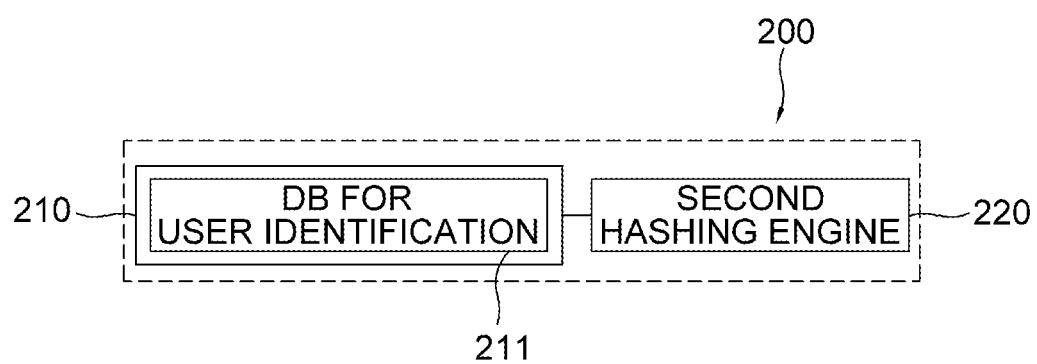
FIG. 3 is a block diagram schematically illustrating a detailed configuration of an issuance-requesting server of the system for issuing the specific certificate based on the blockchain network in accordance with one example embodiment of the present disclosure.
Figure 4:
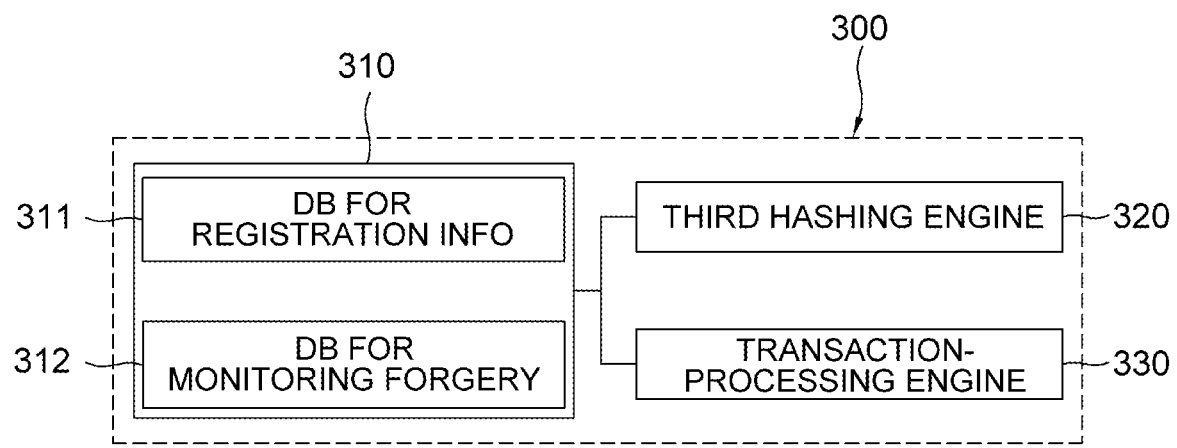
FIG. 4 is a block diagram schematically illustrating a detailed configuration of a certificate-managing server of the system for issuing the specific certificate based on the blockchain network in accordance with one example embodiment of the present disclosure.
Figure 5:
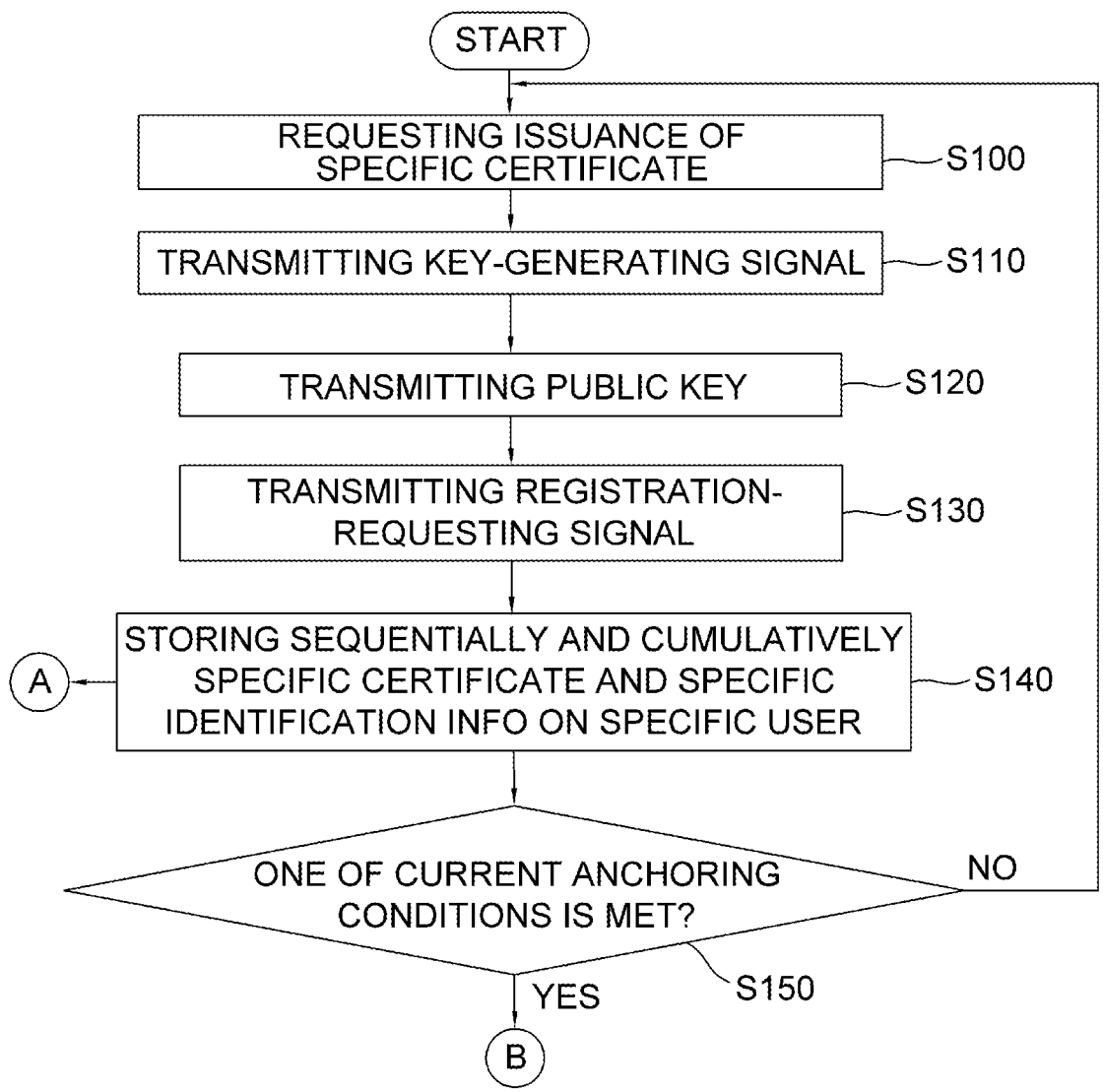
FIGS. 5 to 8 are flow charts schematically illustrating a process of issuing the specific certificate by using the system for issuing the specific certificate based on the blockchain network in accordance with one example embodiment of the present disclosure.
Figure 6:
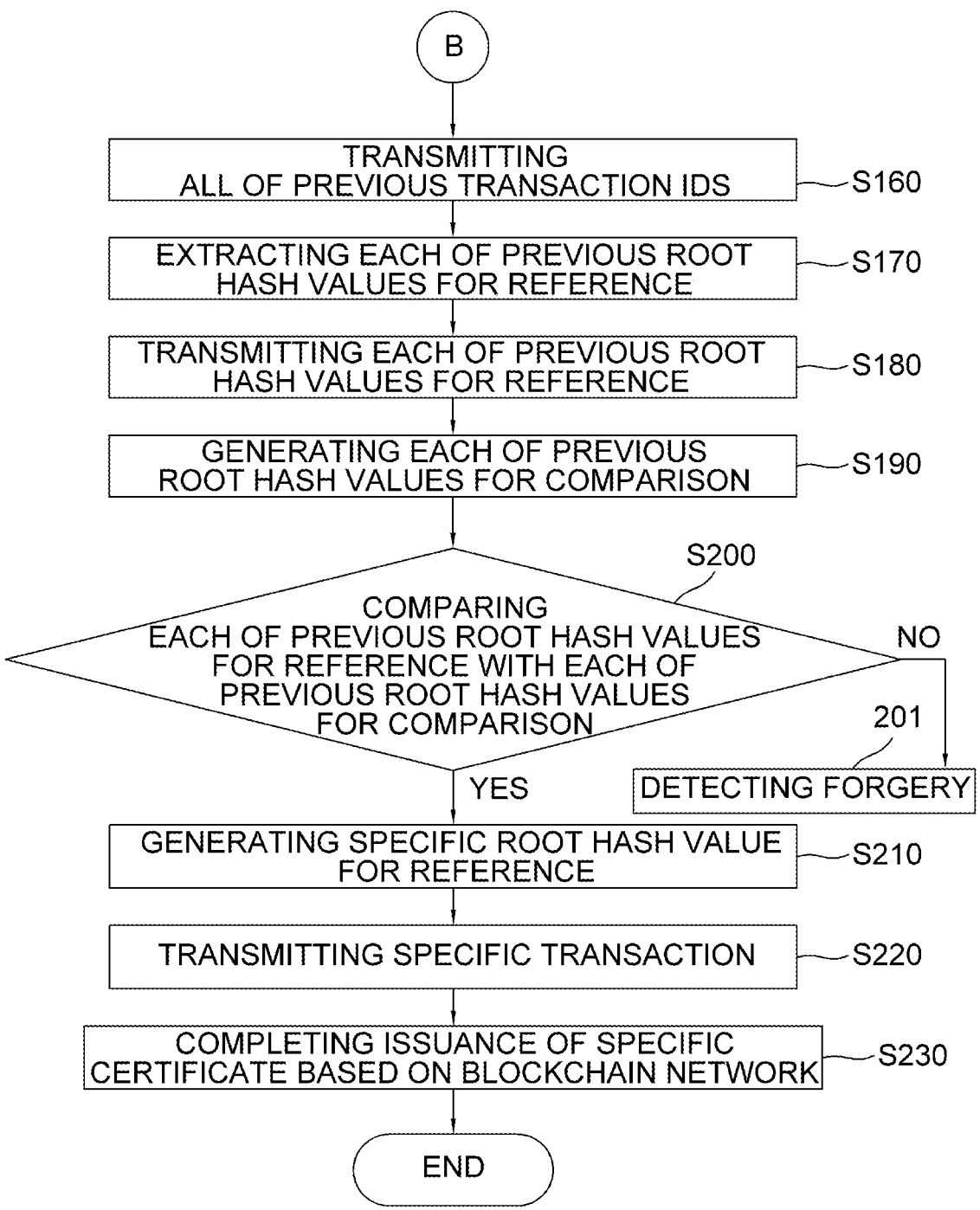
Figure 7:
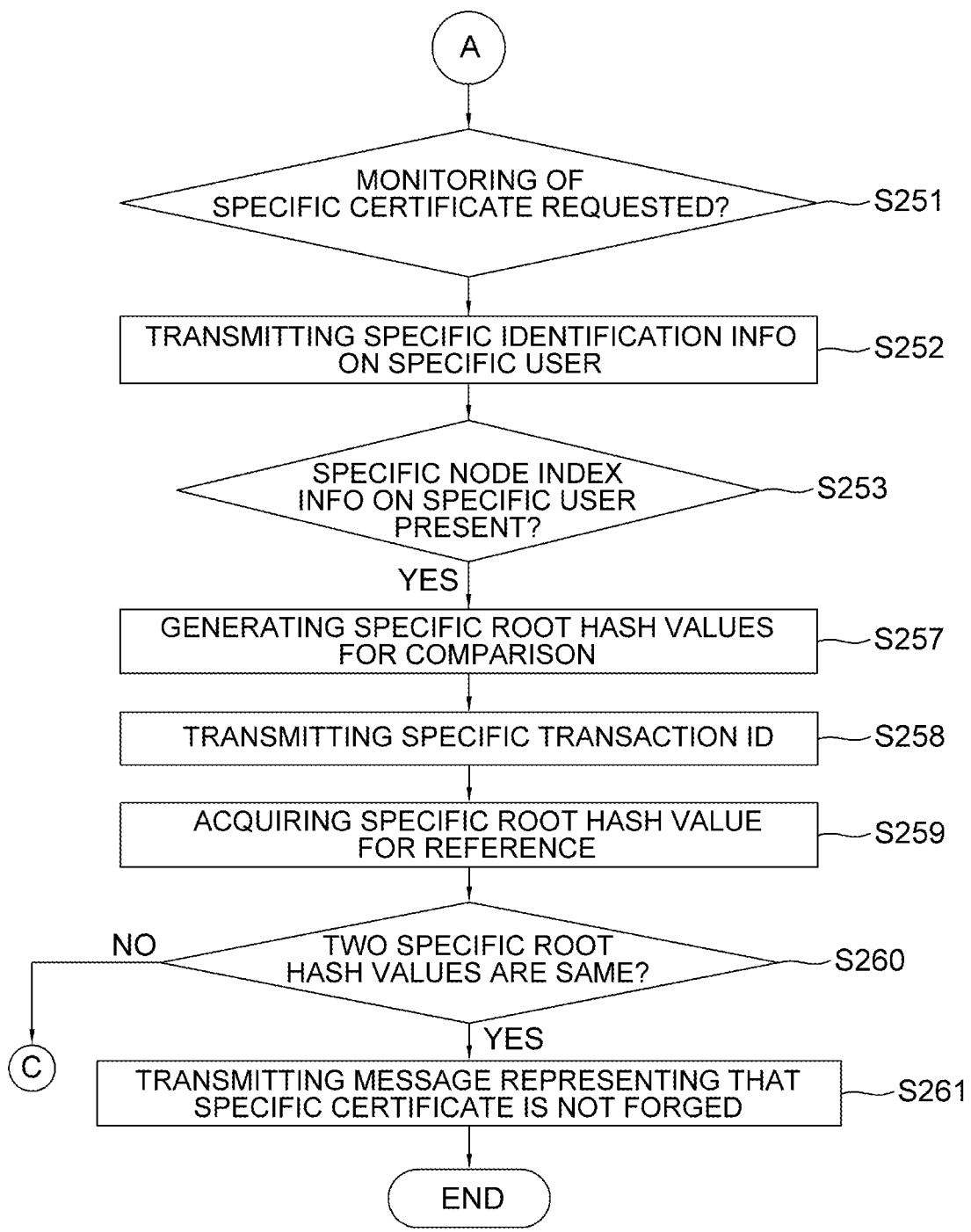
Figure 8:
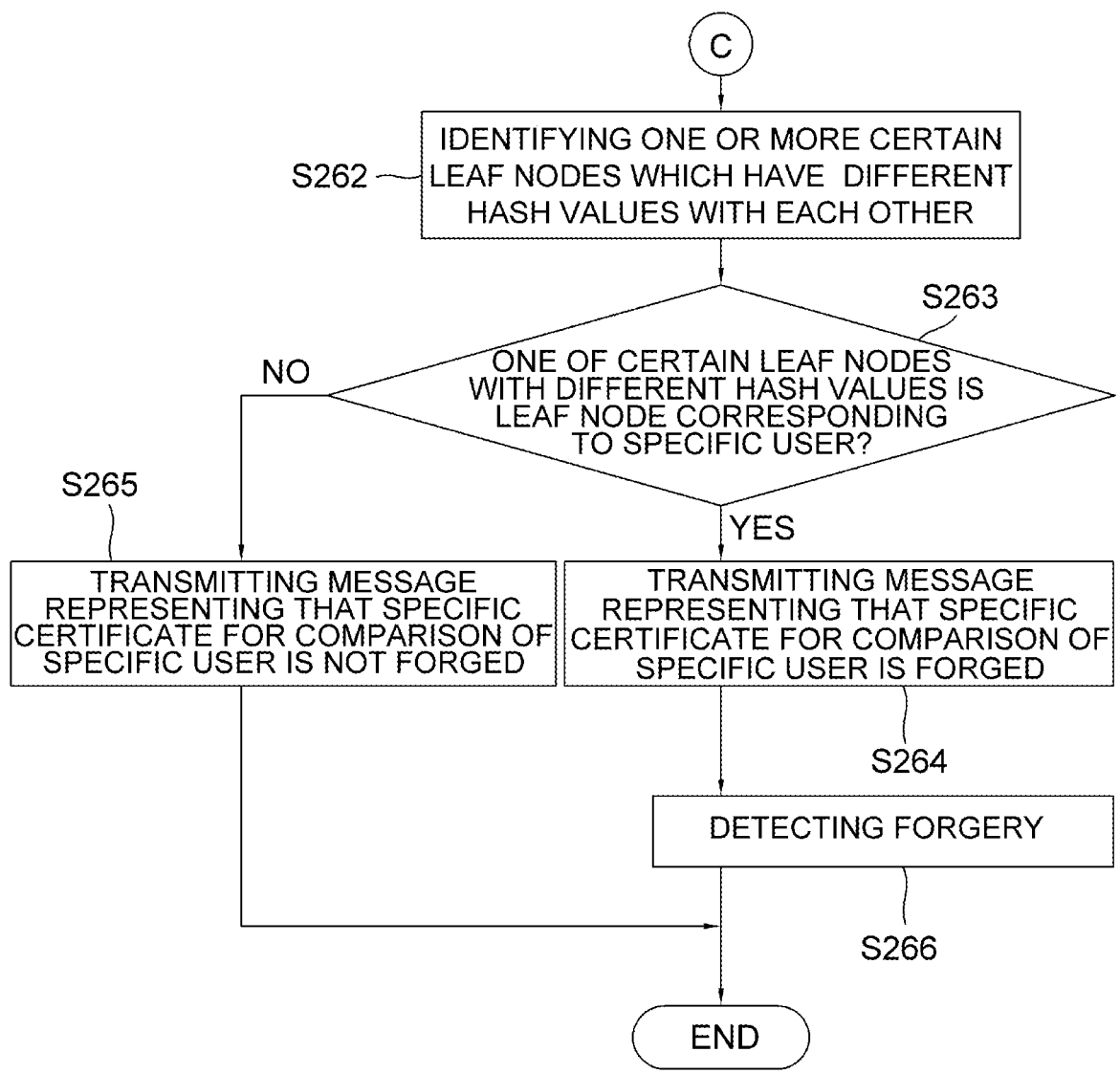

Herein, FIGS. 1 to 8 may illustrate a system and a method for issuing the specific certificate based on the blockchain network.

As illustrated, the system for issuing the specific certificate based on the blockchain network in accordance with the present disclosure may include a specific user device 100, an issuance-requesting server 200, a certificate-managing server 300, and the blockchain network 400.

First, the specific user device 100 may generate a public key and a private key of a specific user corresponding to a public key for the specific certificate and a private key for the specific certificate, and may transmit the generated public key and personal information on the specific user required for issuing the specific certificate based on the blockchain network. Herein, the personal information may date of the specific user, a phone number of the specific user, and an e-mail address of the specific user.

The specific user device 100 performing such functions may be comprised of a key-generating engine 110 to generate the public key and the private key of the specific user, a memory 120 where the generated private key is stored, a first encrypting engine 130, a first hashing engine 140, a first decrypting engine 160, and a controlling part 150 which manages the key-generating engine 110, the first encrypting engine 130, the first hashing engine 140, and the first decrypting engine 160. In addition, the specific user device 100 may include a communication part (not illustrated) and a processor including the controlling part 150.

If the specific user device 100 is in a form of desktop computer, such as a PC, then the key-generating engine 110, the first encrypting engine 130, the first hashing engine 140, and the first decrypting engine 160 may be loaded in a form of application, and if the specific user device 100 is a mobile device such as a smart phone that is able to access the Internet, these engines may be loaded in a form of application exclusively used for mobile devices.

Before generating the public key and the private key of the specific user, the specific user device 100 may confirm whether the specific user operating the specific user device 100 has registered specific identification information on the specific user in the issuance-requesting server 200.

In order to do so, a first DB part 210 may be deployed on the issuance-requesting server 200, and the specific identification information on the specific user who is operating the specific user device 100 is stored in the first DB part 210 which may also include a DB 211 for user identification which contains the personal information on the specific user that has been matched with the specific identification information on the specific user.

Then, the specific user device 100 may transmit the personal information to the issuance-requesting server 200 to request the issuance of the specific certificate based on the blockchain network. The issuance-requesting server 200, then, may compare the received personal information with information stored in the DB 211 for user identification, and if identical information is determined as stored, may generate and transmit a key-generating signal that instructs creation of the public key and the private key of the specific user to the specific user device 100.

If the key-generating signal is acquired from the issuance-requesting server 200, the specific user device 100 may instruct the key-generating engine 110 to generate the public key and the private key of the specific user, where the specific user device 100 may allow the public key and the private key to be generated while a network is being disconnected to prevent possible leakage of the keys.

The issuance-requesting server 200 may acquire the personal information and the public key of the specific user from the specific user device 100, and may transmit a registration-requesting signal including the acquired public key and identification information corresponding to the acquired personal information to the certificate-managing server 300 for managing the specific certificate described later. In addition, the issuance-requesting server 200 may include a communication part (not illustrated) and a processor (not illustrated). The issuance-requesting server 200 typically achieves desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Herein, the issuance-requesting server 200 may include a second hashing engine 220 which may hash the personal information, to thereby generate and transmit the specific identification information on the specific user to the certificate-managing server 300.

The issuance-requesting server 200 with such functions may be a server of a company whose service requires the specific certificate, like a server of a bank or a securities firm, a server of a government institution, or a server of an on-line Internet shopping mail.

The certificate-managing server 300 may store sequentially and cumulatively in the DB 311 for registration information the specific identification information on the specific user and the specific certificate of the specific user including the public key of the specific user contained in the registration-requesting signal from the issuance-requesting server 200 such that the specific certificate corresponds to the specific identification information on the specific user, and if one of current anchoring conditions for registering a specific transaction in the blockchain network 400 is satisfied, may instruct a third hashing engine 320 to hash previous certificates stored through previous transactions before the specific transaction, for example, hash the previous certificates in the order of their storing, may apply a Merkle tree operation to each of leaf nodes including each of hash values of the certificates to thereby generate a specific root hash value for reference, may instruct a transaction-processing engine 330 to generate the specific transaction including the specific root hash value for reference and generate a specific transaction ID used as a key value to search for the specific transaction, and transmit the specific transaction. In addition, the certificate-managing server 300 may include a communication part (not illustrated) and a processor (not illustrated). The certificate-managing server 300 typically achieves desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (MAS) device and a storage area network (SAN) as the computing device and any instructions that allow the computing device to function in a specific way as the computer software.

Herein, the DB 311 for registration information may be managed by a second DB part 310.

Also, the DB 311 for registration information may store all of the certificates, all pieces of root hash identification information used for identifying all of the root hash values for reference, and all pieces of node index information, as corresponding to all pieces of the identification information, including (i) each of all of the hash values corresponding to each of all of the leaf nodes used for the Merkle tree operation of sill of the root hash values for reference, and (ii) all pieces of the identification information on each of all of the users corresponding to each of all of the leaf nodes.

Also, the second DB part 310 may include a DB 312 for monitoring forgery where all of transaction IDs generated processing engine 330, and their corresponding root hash identification information, are stored cumulatively.

Also, if one of the current anchoring conditions is satisfied, the certificate-managing server 300 may monitor whether one of next anchoring conditions is satisfied for each of subsequent certificates corresponding to the identification information stored in the DB 311 for registration information, after said one of the current anchoring conditions is satisfied, to thereby allow the subsequent certificates based on the blockchain network to be issued to new users.

Herein, the current anchoring conditions include one of a condition that a predetermined number of the certificates are stored after a previous anchoring condition is satisfied and a condition that a predetermined time is lapsed after the previous anchoring condition is satisfied. By processing the transactions of the certificates of the users stored between a previous and a current anchoring conditions, the network traffic may be minimized and the network overload may be reduced.

Meanwhile, the certificate-managing server 300 may monitor the certificates stored in the DB 311 for registration information to detect forgery during the process of the issuance of the certificates based on the blockchain network, to thereby react by detecting forgery of any certificates due to illegal activities like hacking.

For this purpose, if one of the current anchoring conditions is satisfied, the certificate-managing server 300 may extract all of previous transaction IDs stored in the DB 312 for monitoring forgery, and may transmit all of the previous transaction IDs to the block chain net work 400 comprised of blockchain nodes 410.

At least one of the blockchain nodes 410 in the blockchain nodes 400 may retrieve the previous transactions corresponding to the previous transaction IDs from the distributed database stored in the blockchain network 400, i.e., the blockchain nodes 410, by referring to the transmitted previous transaction IDs, may extract each of previous root hash values for reference included in each of the previous transactions, and may transmit each of the previous root hash values for reference to the certificate-managing server 300.

Thereafter, the certificate-managing server 300 may acquire each of the previous root hash values for reference, and may identify each of the previous certificates, corresponding to previous identification information, stored in the DB 311 for registration information as corresponding to each of the previous root hash values for reference. That is, the certificate-managing server 300 may acquire each of previous root hash identification information for reference corresponding to each of the previous root hash values for reference, and may organize previous certificates to be corresponding to leaf nodes of the previous node index information, by referring to the previous identification information corresponding to each of the previous root hash identification information for reference.

Then, the certificate-managing server 300 may instruct the third hashing engine 320 to apply the Merkle tree operation to leaf nodes including previous hash values for comparison of each of the previous certificates, to thereby generate each of previous root hash values for comparison.

Thereafter, the certificate-managing server 300 may pair the transmitted previous root hash values for reference with the generated previous root hash values for comparison corresponding thereto.

Thereafter, the certificate-managing server 300 may compare the previous root hash values for reference with the previous root hash values for comparison, to thereby determine whether the two hash values are the same.

If every previous root hash value is determined as identical to each other within each pair of the two previous root hash values, the certificate-managing server 300 may determine that there is no forgery of information related to the previous certificates, and may allow the specific transaction to be generated.

However, if there is a pair whose previous root hash values are different, the certificate-managing server 300 may determine that forgery of the information related to the previous certificates occurred, and may prevent the specific transaction from being generated, and may perform processes of handling the forgery.

In addition, the certificate-managing server 300 may instruct the third hashing engine 320 to generate root hash identification information used for identifying the previous root hash values, and Merkle tree information on the previous root hash values, i.e., previous node index information.

Also, the certificate-managing server 300 may store the certificates, the specific node index information, the specific root hash identification information in the DB 311 for registration information as corresponding to the specific identification information on the specific user, and may further store the specific root hash identification information in the DB 312 for monitoring forgery.

Then, the issuance-requesting server 200 may store the previous transaction IDs generated at the transaction-processing engine 320 in the DB 312 for monitoring forgery, to thereby allow the previous transaction IDs and their corresponding previous root hash identification information to be stored and managed in the DB 312 for monitoring forgery.

Meanwhile, the more the root hash values in the blockchain network 400 comprised of the blockchain nodes 410 are connected to each other, the more difficult the forgery becomes.

Herein, on condition that a certain previous root hash value for reference, created right before said one of the current anchoring conditions is satisfied, has been stored in a predetermined leaf node among leaf nodes corresponding to the specific root hash value for reference to be generated, the certificate-managing server 300 may instruct the third hashing engine 320 to apply the Merkle tree operation to each of the leaf nodes, one of which includes the certain previous root hash value for reference, to thereby generate the specific roof hash value for reference.

In case all of the root hash values for reference included in all of the transactions stored in the blockchain network 400 of the blockchain nodes 410, their structures show a connected chain of all of the root hash values from the firstly-registered to the lastly-registered, thus, as the number of all of the transactions stored in the blockchain network 400 of the blockchain nodes 410 increases, the certificate-managing server 300 may make it difficult to forge the certificates caused by the illegal activities.

Also, auditors of the certificates who are related to the government institutions may request an audit via a verification-requesting device 500 to confirm whether the information related to the certificates, issued in accordance with the present disclosure, is forged.

For this purpose, the auditors may instruct the verification-requesting device 500 to transmit a request for monitoring the specific certificate of the specific user to the issuance-requesting server 200.

Thereafter, the issuance-requesting server 200 may extract the specific identification information on the specific user who requested the monitoring of the specific certificate from the DB 211 for user identification, and transmit the specific identification information to the certificate-managing server 300.

The certificate-managing server 300 may confirm a presence of the specific node index information on the specific user in the DB 311 for registration information by referring to the specific identification information on the specific user who requested the monitoring.

Thereafter, if the specific node index information on the specific user does not exist, the certificate-managing server 300 may instruct the third hashing engine 320 to hash, for example, sequentially hash in the order of storing, the certificates stored sequentially in the DB 311 for registration information that do not correspond to any node index information, to thereby generate each of hash values of each of the certificates.

Thereafter, the certificate-managing server 300 may apply the Merkle tree operation to each of leaf nodes including each of the hash values of each of the certificates created by the third hashing engine 320, to thereby generate the specific root hash value for reference and may generate (i) the specific root hash identification information used for identifying the specific root hash value for reference, and (ii) specific node index information on (ii-1) each of locations of each of the leaf nodes including each of the hash values of each of the certificates and (ii-2) each of the hash values of each of the certificates.

Thereafter, the certificate-managing server 300 may instruct the transaction-processing engine 320 to generate (i) the specific transaction including the specific root hash value for reference and (ii) the specific transaction ID used as a key value to search for the specific transaction, and transmit the specific transaction to the blockchain network 400 comprised of the blockchain nodes 410.

The blockchain network 400 comprised of the blockchain nodes 410 may store the transmitted specific transaction in the blockchain network 400, that is, the distributed database of each of the blockchain nodes 410.

And if the specific node index information on the specific user is determined as present, the certificate-managing server 300 may instruct the third hashing engine 320 to hash all of the certificates corresponding to the specific root hash identification information, to thereby generate each of the hash values for comparison by referring to the specific root hash identification information corresponding to the specific identification information on the specific user, and apply the Merkle tree operation to each of the leaf nodes, to thereby generate the specific root hash value for comparison by referring to the specific node index information including each of the hash values for comparison. That is, the certificate-managing server 300 may apply the Merkle tree operation to each of the leaf nodes including each of the hash values for comparison of each of the certificates corresponding to the specific root hash identification information, to thereby generate the specific root hash value for comparison, by referring to specific root hash identification information corresponding to the specific identification information on the specific user.

Thereafter, the certificate-managing server 300 may acquire the specific transaction ID, by referring to the specific root hash identification information corresponding to the specific identification information on the specific user and may transmit the specific transaction ID to the blockchain network 400 comprised of the blockchain nodes 410. Herein, the specific transaction ID may be acquired by any one of the blockchain network 400 comprised of the blockchain nodes 410 distributed throughout the world, and may be acquired by a node pre-designated for efficiency.

Thereafter, at least one blockchain node among the blockchain nodes 410 may retrieve the specific transaction from the distributed database of the blockchain network 400 by referring to the specific transaction ID, may extract the specific root hash value for reference included in the retrieved specific transaction, and may transmit the specific root hash value for reference to the certificate-managing server 300.

Thereafter, the certificate-managing server 300 may acquire the specific root hash value for reference, and may compare the acquired specific root hash value for reference with the specific root hash value for comparison, to thereby determine whether the two hash values are identical to each other.

Then, if the specific root hash value for reference and the specific root hash value for comparison are identical with each other, the certificate-managing server 300 may compare (i) a specific hash value for reference included in a leaf node, of the specific user, among the leaf nodes corresponding to the specific root hash value for reference and (ii) a specific hash value for comparison included in a leaf node, of the specific user, among the leaf nodes corresponding to the specific root hash value for comparison, and if the specific hash value for reference and the specific hash value for comparison are identical, the certificate-managing server 300 may allow a message, representing the specific certificate of the specific user is authentic, to be transmitted to the verification-requesting device 500.

On the other hand, if the specific root hash value for reference and the specific root hash value for comparison are not identical to each other, then the certificate-managing server 300 may compare, for all the leaf nodes, (i) each of hash values of each of the certificates in each of the leaf nodes used to calculate the specific root hash value for reference corresponding to the specific hash value for reference, and (ii) its corresponding each of hash values of each of the certificates in each of the leaf nodes used to calculate the specific root hash value for comparison corresponding to the specific hash value for comparison, and identify one or more certain leaf nodes, which have different hash values with each other, among all the leaf nodes.

Thereafter, if one of the leaf nodes which includes a different hash value corresponds to the specific certificate of the specific user, the certificate-managing server 300 may allow a message, representing the specific certificate of the specific user is forged, to be transmitted to the verification-requesting device 500.

Also, if the leaf node including the different hash value of the specific certificate does not correspond to the specific certificate of the specific user, the certificate-managing server 300 may allow a message, representing the specific certificate of the specific user is not forged, to be transmitted to the verification-requesting device 500.

Although the issuance-requesting server 200 and the certificate-managing server 300 are described as separate devices in the above description, a single server, i.e., an authentication-supporting server 2000, may function as the issuance-requesting server 200 and the certificate-managing server 300.

That is, the authentication-supporting server 2000 may include a communication part (not illustrated) and a processor (not illustrated). Identical reference numerals are for convenience of explanation but not intended for representing sameness of separate devices. Further, in accordance with another example embodiment of the present disclosure, the method may be performed by the authentication-supporting server 2000 or another server of a different configuration. Further, the authentication-supporting server 2000 may be servers corresponding to each of nodes of the blockchain network 400, or may be a server managing each of the node of the blockchain network 400, or may be a transaction server.

Specifically, the authentication-supporting server 2000 typically achieves desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP session, but the scope of the present disclosure is not limited thereto. For example, they could be transmitted and received as UDP datagrams.

Also, the processor of such devices may include hardware configuration of MPU (Micro Processing Unit) or CPU (Central Processing Unit), cache memory, data bus, etc. Additionally, OS and software configuration of applications that achieve specific purposes may be further included.

A process of the issuance of the specific certificate based on the blockchain network by using the system for issuing the specific certificate based on the blockchain network in accordance with the present disclosure is described as follows.

First, the specific user may access the issuance-requesting server 200 by way of the specific user device 100 and may transmit specific personal information for the issuance of the specific certificate based on the blockchain network, to thereby request the issuance, at a step of S100.

The issuance-requesting server 200 may confirm the acquired specific personal information, may create a key-generating signal for instructing a creation of a private key for the specific certificate and a public key for the specific certificate, and may transmit the key-generating signal to the specific user device 100 which requested the issuance of the specific certificate based on the blockchain network, at a step of S110.

If the key-generating signal is received, the specific user device 100 may instruct a key-generating engine 110 to generate the public key and the private key of the specific user, may store the private key in the memory 120, and may transmit the public key to the issuance-requesting server 200, at a step of S120.

The issuance-requesting server 200 may acquire the public key of the specific user, may send a registration-requesting signal including the specific identification information on the specific user corresponding to the specific personal information on the specific user and the public hey to the certificate-managing server 300, at a step of S130, and herein, the issuance-requesting server 200 may instruct the second hashing engine 220 to hash the specific personal information, to thereby generate the specific identification information on the specific user.

If the registration-requesting signal including the public hey and the specific identification information on the specific user for the issuance are acquired, the certificate-managing server 300 may sequentially and cumulatively store the specific identification information on the specific user and the specific certificate including the public key of the specific user in the DB 311 for registration information such that the specific certificate corresponds to the specific identification information on the specific user, at a step of S140.

Thereafter, the certificate-managing server 300 may confirm whether one of the current anchoring conditions is met, at a step of S150. That is, the certificate-managing server 300 may monitor whether one of the current anchoring conditions is satisfied to register the specific transaction in the blockchain network 400 while storing the certificates. Herein, the current anchoring conditions include one of a condition that a predetermined number of the certificates are stored after a previous anchoring condition is satisfied and a condition that a predetermined time is lapsed after the previous anchoring condition is satisfied.

First, the certificate-managing server 300 may count the number of the certificates until the number reaches a predetermined number for calculation of the root hash values, or may store the certificates until one of the current anchoring conditions is satisfied.

Then, if one of the current anchoring conditions is satisfied, the certificate-managing server 300 may extract all of previous transaction IDs from the DB 312 for monitoring forgery, and may transmit all of the previous transaction IDs to the blockchain network 400 comprised of blockchain nodes 410, at a step of S160.

At least one of the blockchain nodes 410 in the blockchain nodes 400 may retrieve each of the previous transactions corresponding to the previous transaction IDs from the blockchain network 400, i.e., the distributed database, by referring to each of the transmitted previous transaction IDs, and may extract each of previous root hash values included in each of the previous transactions, at a step of S170.

Thereafter, the blockchain nodes 410 may transmit said each of the previous root hash values to the certificate-managing server 300, at a step of S180.

After acquiring each of the previous root hash values as the previous root hash values for reference, the certificate-managing server 300 may match each of the previous certificates, cumulatively stored in the DB 311 for registration information with correspondence to the previous identification information, with each of the previous root hash values for reference, may instruct the third hashing engine 320 to hash each of the previous certificates, to thereby generate each of the previous hash values for comparison, and may apply the Merkle tree operation to each of the leaf nodes including each of the previous hash values for comparison, to thereby generate each of the previous root hash values for comparison, at a step of S190. That is, the certificate-managing server 300 may acquire each of the previous certificates corresponding to each of the previous root hash values for reference, and may apply the Merkle tree operation to each of the leaf nodes including each of the previous hash values for comparison of each of the previous certificates, to thereby generate the previous root hash values for comparison.

Thereafter, the certificate-managing server 300 may compare said each of the previous root hash values for reference with said each of the previous root hash values for comparison sequentially, to thereby determine whether every each of compared pairs has identical previous root hash values, at a step of S200. That is, the certificate-managing server 300 may determine whether each of the previous root hash values for reference retrieved from the blockchain network 400 is identical to each of its corresponding previous root hash values for comparison.

Meanwhile, if at least one part of each of the previous root hash values for reference retrieved from the blockchain network 400 is determined as not identical to each of its corresponding previous root hash values for comparison, then the certificate-managing server 300 may determine that said part of the previous certificates stored in the DB 311 for registration information is forged, at a step of S201, and may perform processes of handling the forgery.

Also, if each of the previous root hash values for reference retrieved from the blockchain network 400 is determined as identical to each of its corresponding previous root hash values for comparison, then the certificate-managing server 300 may determine that the previous certificates are not forged, and may instruct the third hashing engine 320 to hash the certificates stored until one of the current anchoring conditions is satisfied, to thereby generate each of the hash values of each of the certificates.

Then, the certificate-managing server 300 may instruct the third hashing engine 320 to apply the Merkle tree operation to each of the leaf nodes including each of the hash values for reference, to thereby generate the specific root hash value for reference, at a step of S210. Herein, the certificate-managing server 300 may generate the specific root hash identification information used for identifying the specific root hash value for reference, and the Merkle free information on the specific root hash value for reference, i.e., the specific node index information which includes (i) each of the hash values corresponding to each of the leaf nodes used for the Merkle tree operation of the specific root hash value for reference, and (ii) the identification information on each of the users corresponding to each of the leaf nodes.

Thereafter, the certificate-managing server 300 may instruct the transaction-processing engine 320 to generate (i) the specific transaction including the specific root hash value for reference and (ii) the specific transaction ID used as a key value to search for the specific transaction, and transmit the specific transaction to the blockchain network 400 comprised of the blockchain nodes 410, at a step of S220.

Herein, on condition that the certain previous root hash value for reference, created right before said one of the current anchoring conditions is satisfied, has been stored in a predetermined leaf node among leaf nodes corresponding to the specific root hash value for reference to be generated, the certificate-managing server 300 may instruct the third hashing engine 320 to apply the Merkle tree operation to each of the leaf nodes, one of which includes the certain previous root hash value for reference, to thereby generate the specific root hash value for reference. That is, one of the leaf nodes may include the certain previous root hash value for reference created right before said one of the current anchoring conditions is satisfied.

At least one of the blockchain nodes 410 in the blockchain network 400 may store the acquired specific transaction in the blockchain network 400, i.e., the distributed database in the blockchain network 400, to thereby complete the issuance, at a step of S230.

Also, the auditors of the certificates who are related to the government institutions may request an audit via a verification-requesting device 500 to confirm whether the information related to the specific certificate issued in accordance with the present disclosure is forged.

For this purpose, the issuance-requesting server 200 may determine whether the verification-requesting device 500 requested monitoring of the specific certificate, at a step of S251, and if the monitoring is determined to have been requested, the issuance-requesting server 200 may retrieve the specific identification information of the specific user whose specific certificate is the subject of the requested monitoring from the DB 211 for user identification, and may transmit the specific identification information to the certificate-managing server 300, at a step of S252.

Then, the certificate-managing server 300 may confirm a presence of the specific node index information on the specific user in the DB 311 for registration information by referring to the specific identification information on the specific user whose specific certificate is the subject of the requested monitoring.

If the specific node index information on the specific user is determined as present in the DB 311 for registration information, then the certificate-managing server 300 may directly enter a step of S257 described later, where the specific root hash value for comparison is generated.

Then, if the specific node index information on the specific user does not exist, the certificate-managing server 300 may instruct the third hashing engine 320 to hash the certificates matching the identification information stored sequentially in the DB 311 for registration information that do not correspond to any node index information, to thereby generate each of hash values of each of the certificates.

And if the specific node index information on the specific user is determined as present, the certificate-managing server 300 may instruct the third hashing engine 320 to hash all of the certificates corresponding to the specific root hash identification information, to thereby generate hash values for comparison by referring to specific root hash identification information corresponding to the specific identification information on the specific user and apply the Merkle tree operation to each of the leaf nodes, to thereby generate the specific root hash value for comparison by referring to specific node index information including each of the hash values for comparison, at a step of S257. That is, the certificate-managing server 300 may apply the Merkle tree operation to each of the leaf nodes including each of the hash values for comparison of each of the certificates corresponding to the specific root hash identification information, to thereby generate the specific root hash value for comparison, by referring to the specific root hash identification information corresponding to the specific identification information on the specific user.

Thereafter, the certificate-managing server 300 may acquire the specific transaction ID, by referring to the specific root hash identification information corresponding to the specific identification information on the specific user and may transmit the specific transaction ID to the blockchain network 400 comprised of the blockchain nodes 410, at a step of S258.

Thereafter, at least one of the blockchain nodes 410 among the blockchain network 400 may retrieve the specific transaction from the blockchain network 400, i.e., the distributed database by referring to the specific transaction ID, may extract the specific root hash value for reference included in the retrieved specific transaction, and may transmit the specific root hash value for reference to the certificate-managing server 300, at a step of S259.

Thereafter, the certificate-managing server 300 may acquire the specific root hash value for reference, and may compare the specific root hash value for reference with the specific roof hash value for comparison, to thereby determine whether the two hash values are identical to each other, at a step of S260.

That is, if a request for verification of the specific certificate including the specific identification information on the specific user is acquired, the certificate-managing server 300 may perform (i) a process of generating the specific root hash value for comparison by applying the Merkle tree operation to each of leaf nodes respectively including each of hash values for comparison of each of the certificates corresponding to the specific root hash identification information, by referring to the specific roof hash identification information corresponding to the specific identification information on the specific user, (ii) one of (ii-1) a process of retrieving from the distributed database the specific root hash value, as the specific root hash value for reference, included in the specific transaction corresponding to the specific transaction ID related to the specific root hash identification information, and (ii-2) a process of instructing at least one of the blockchain nodes 410 in the blockchain network 400 to retrieve from the distributed database the specific root hash value for reference included in the specific transaction corresponding to the specific transaction ID; and (iii) a process of confirming a validity of the specific certificate by referring to the specific root hash value for comparison and the specific root hash value for reference.

On the other hand, if the specific root hash value for comparison and the specific root hash value for reference are determined as identical, the certificate-managing server 300 may allow a message, representing that the specific certificate is not forged, to be transmitted to the verification-requesting device 500, at a step of S261.

Then, if the specific root hash value for reference and the specific root hash value for comparison are not identical to each other, then the certificate-managing server 300 may compare, for all the leaf nodes, (i) each of hash values of each of the certificates in each of the leaf nodes used to calculate the specific root hash value for reference corresponding to the specific hash value for reference, and (ii) its corresponding each of hash values of each of the certificates in each of the leaf nodes used to calculate the specific root hash value for comparison corresponding to the specific hash value for comparison, and identify one or more certain leaf nodes, which have different hash values with each other, among all the leaf nodes, at a step of S262.

Then, after recognizing the specific node index information corresponding to the specific certificate at the step of S262, the certificate-managing server 300 may confirm whether one of the certain leaf nodes with the different hash values is the leaf node corresponding to the specific user, at a step of S263.

If the leaf node with the different hash value is the leaf node corresponding to the specific user, the certificate-managing server 300 may allow a message, representing that the specific certificate for comparison of the specific user is forged, to be transmitted to the verification-requesting device 500, at a step of S264.

Also, if any one of the certain leaf nodes with the different hash values is not the leaf node corresponding to the specific user, the certificate-managing server 300 may allow a message, representing that the specific certificate for comparison of the specific user is not forged, to be transmitted to the verification-requesting device 500, at a step of S265.

That is, if the specific root hash value for comparison and the specific root hash value for reference are not identical to each other, the certificate-managing server 300 may compare (i) each of the hash values for reference, corresponding to each user, in leaf nodes among the leaf nodes corresponding to the specific root hash value for reference and (ii) each of the hash values for comparison in leaf nodes among the leaf nodes corresponding to the specific root hash value for comparison, to thereby determine whether the specific certificate is valid.

Thereafter, the certificate-managing server 300 may determine at least one of the certificates, corresponding to the specific root hash value of leaf nodes related to the specific node index information of the specific certificate among the certificates stored in the DB 311 for registration information, is forged and may handle the forgery.

Although the issuance-requesting server 200 and the certificate-managing server 300 are described as linked with each other to issue the specific certificate based on the blockchain network in the above description, a single server, i.e., the authentication-supporting server 2000, may function as the issuance-requesting server 200 and the certificate-managing server 300 and may issue the specific certificate based on the blockchain network, as described below. In the description below, the part easily deducible from the method for issuing the specific certificate based on the blockchain network by using the issuance-requesting server 200 and the certificate-managing server 300 will be omitted.

First, if the personal information on the specific user for issuing the specific certificate is acquired from the specific user device 100 at the step of S100, the authentication-supporting server 2000 may request the public key of the specific user from the specific user device 100 at the step of S110, to thereby instruct the specific user device 100 to generate the private key and the public key of the specific user and transmit the public key to the authentication-supporting server 2000 at the steps of S120 and S130.

Then, if the public key is acquired, the authentication-supporting server 2000 may store the specific certificate, including at least the public key of the specific user, such that the specific certificate matches the specific identification information corresponding to the specific personal information on the specific user at the step of S140, and may monitor whether one of the current anchoring conditions to register the specific transaction in the blockchain network 400 is satisfied at the step of S150.

Thereafter, if said one of the current anchoring conditions is satisfied, the authentication-supporting server 2000 may perform a process of generating the specific root hash value for reference by applying the Merkle tree operation to each of leaf nodes respectively including each of hash values of each of the certificates stored after the latest previous anchoring condition is satisfied. Herein, the authentication-supporting server 2000 may generate and manage information related to the Merkle tree operation, like of the leaf nodes, and each of the hash values in each of the leaf nodes, at the step of S210.

Then, the authentication-supporting server 2000 may perform (i) one of (i-1) a process of storing the specific transaction including the specific roof hash value for reference in the distributed database on the blockchain network 400, and (i-2) a process of instructing at least one of the blockchain nodes 410 in the blockchain network 400 to store the specific transaction in the distributed database, at the step of S220 and (ii) a process of acquiring a specific transaction ID representing a location of the specific transaction on the distributed database, at the step of S230.

If said one of the current anchoring conditions is satisfied, the authentication-supporting server 2000 may perform (i) one of (i-1) a process of retrieving from the distributed database each of previous root hash values for reference included in each of previous transactions corresponding to each of previous transaction IDs, by referring to the previous transaction IDs acquired before said one of the current anchoring conditions is satisfied, and (i-2) a process of instructing the at least one of the blockchain nodes 410 on the blockchain network 400 to retrieve from the distributed database each of the previous root hash values for reference included in each of the previous transactions corresponding to each of the previous transaction IDs, by referring to the previous transaction IDs acquired before said one of the current anchoring conditions is satisfied, at the steps of S160, S170, and S180.

Then, the authentication-supporting server 2000 may acquire each of the previous certificates corresponding to each of the previous root hash values for reference, and may apply the Merkle tree operation to each of the leaf nodes including each of the previous hash values for comparison of each of the previous certificates, to thereby generate the previous root hash values for comparison at the step of S190, and may compare each of the previous root hash values for reference and each of the previous root hash values for comparison, to thereby determine whether the previous certificates are valid, at the step of S200.

Herein, if one of the previous root hash values for reference is determined as different from its corresponding previous root hash value for comparison, the authentication-supporting server 2000 may determine that at least one of the previous certificates corresponding to said corresponding previous root hash value for comparison is forged at the step of S201.

Also, if a request for verification of the specific certificate including specific identification information on the specific user is acquired at a step of S251, the authentication-supporting server 2000 may apply the Merkle tree operation to each of the leaf nodes including each of the hash values for comparison of each of the certificates corresponding to the specific root hash identification information, to thereby generate the specific root hash value for comparison, by referring to specific root hash identification information corresponding to the specific identification information on the specific user, at a step of S257.

Then, the authentication-supporting server 2000 may perform (i) one of (i-1) a process of retrieving from the distributed database the specific root hash value for reference included in the specific transaction corresponding to the specific transaction ID, by referring to the specific transaction ID and (i-2) a process of instructing the at least one of the blockchain nodes on the blockchain network to retrieve from the distributed database the specific root hash value for reference included in the specific transaction corresponding to the specific transaction ID, at the steps of S258 and S259.

Thereafter, the authentication-supporting server 2000 may compare the specific root hash value for reference and the specific root hash value for comparison at the step of S260, to thereby determine whether the specific certificate is valid, at the step of S261.

Herein, if the specific root hash value for reference is determined as different from the specific root hash value for comparison, the authentication-supporting server 2000 may compare (i) each of hash values for reference included in each of the leaf nodes corresponding to the specific root hash value for reference, and (ii) each of hash values for comparison included in each of the leaf nodes corresponding to the specific root hash value for comparison, at the steps of S262 and S263 to thereby determine at least one forged certificate, among the certificates, corresponding to the specific root hash identification information at the steps of S264, S265, and S266.

That is, if the specific root hash value for reference and the specific root hash value for comparison are not identical to each other, the certificate-managing server 2000 may compare (i) each of the hash valises for reference, corresponding to each user, in one of the leaf nodes corresponding to the specific root hash value for reference and (ii) each of the hash values for comparison in one of the leaf nodes corresponding to the specific root hash value for comparison, to thereby determine whether the specific certificate is valid.

Figure 9:
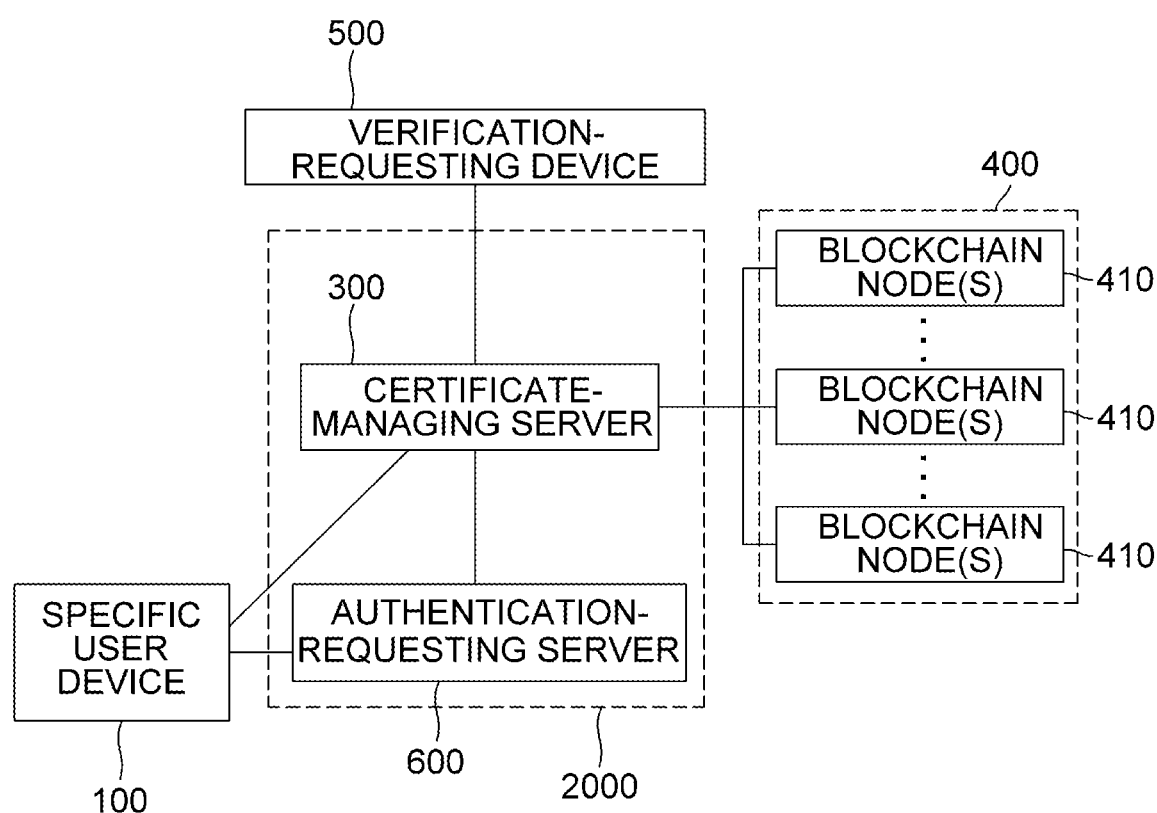
FIG. 9 is a block diagram schematically illustrating a system for authenticating the specific certificate based on the blockchain network in accordance with one example embodiment of the present disclosure.
Figure 10:
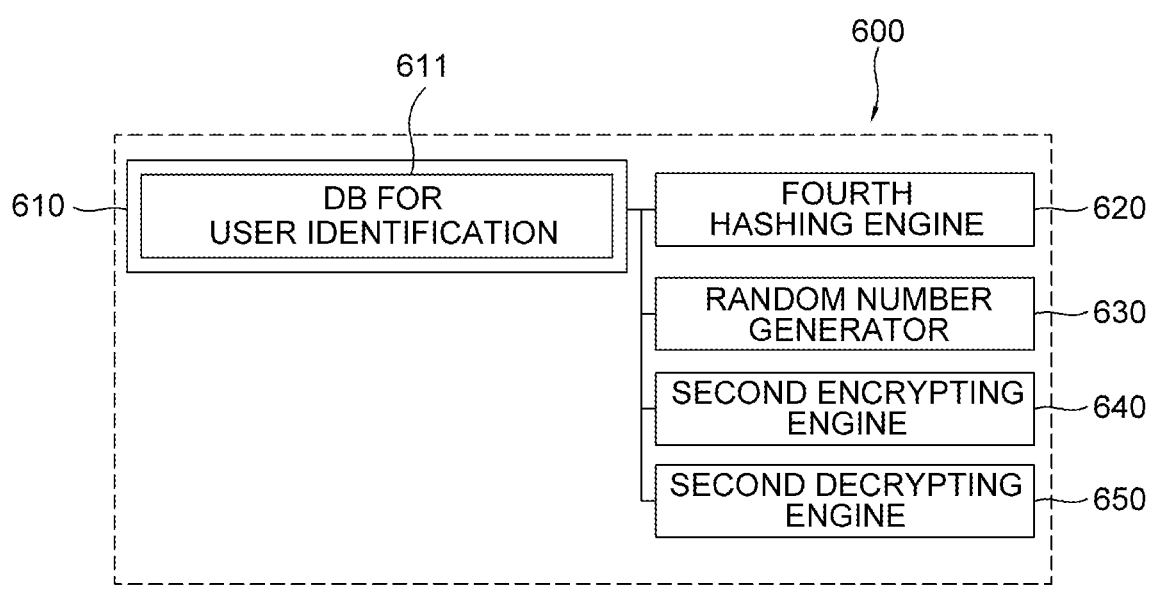
FIG. 10 is a block diagram schematically illustrating a detailed configuration of an authentication-requesting server of the system for authenticating the specific certificate based on the blockchain network in accordance with one example embodiment of the present disclosure.
Figure 11:
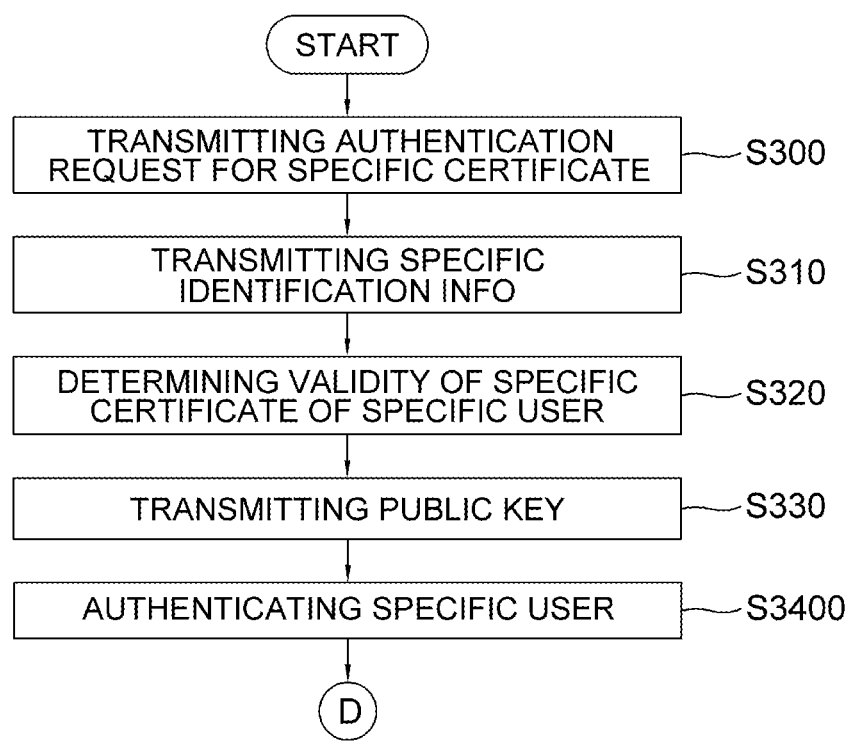
Figure 12:
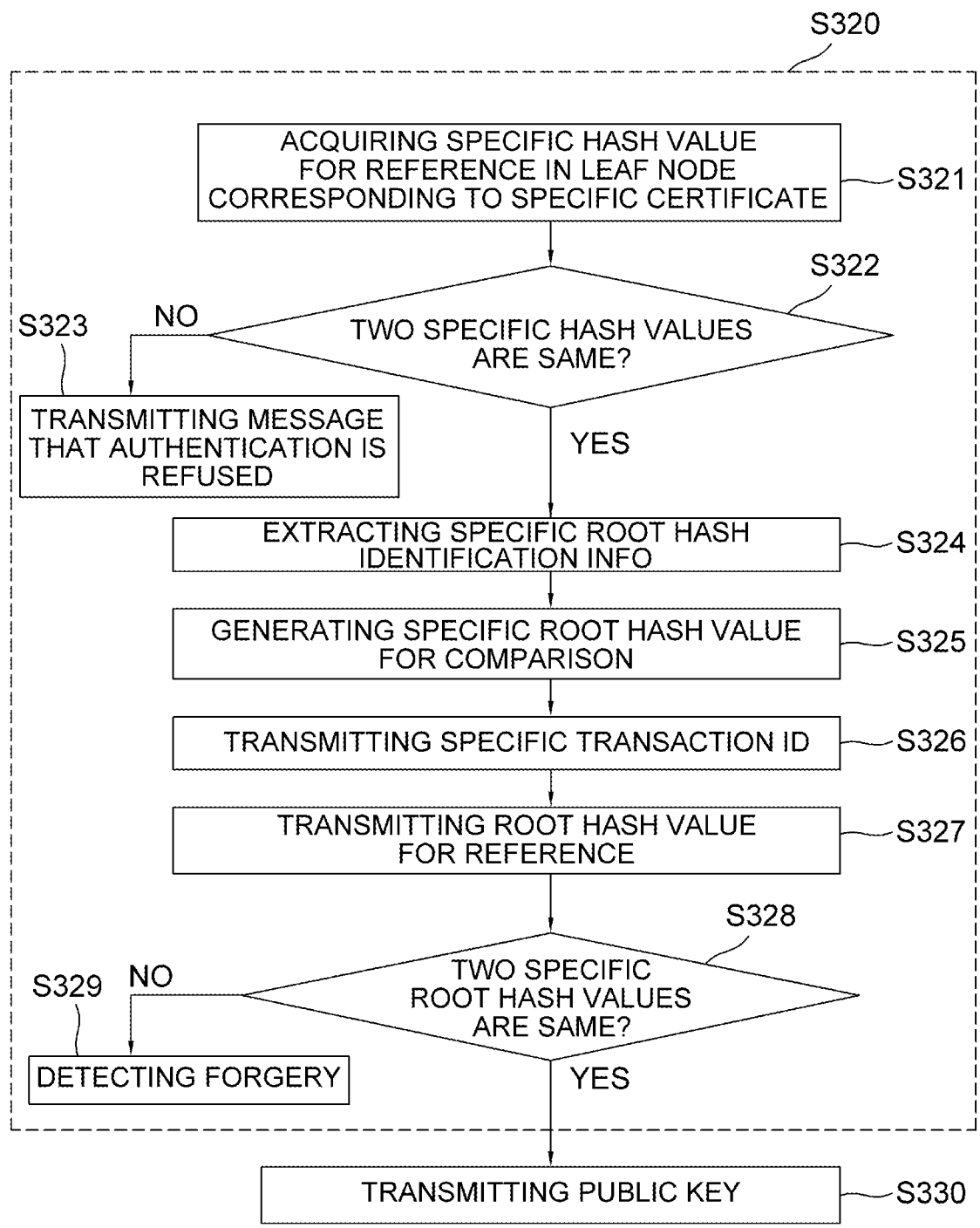
Figure 13:
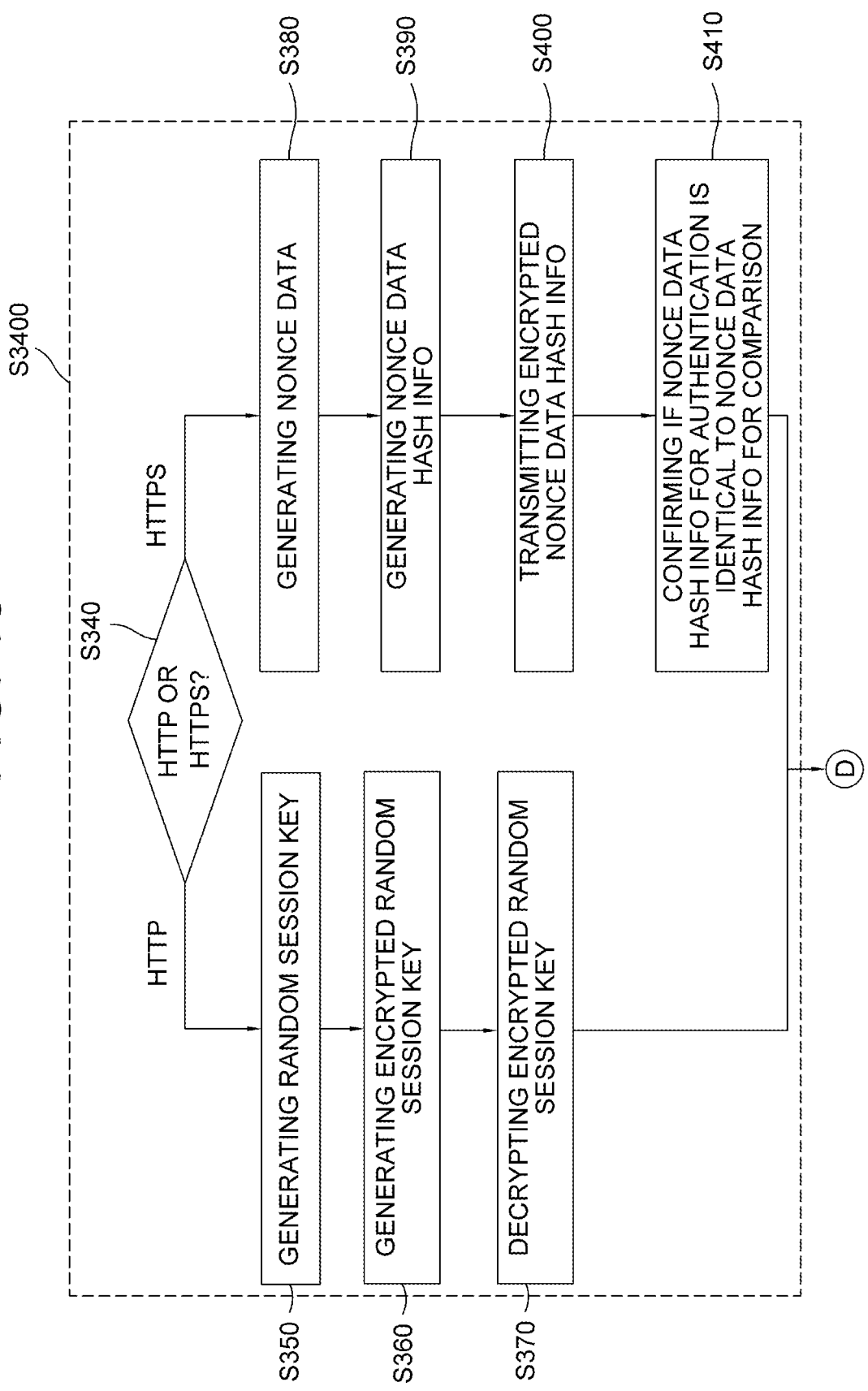
Figure 14:
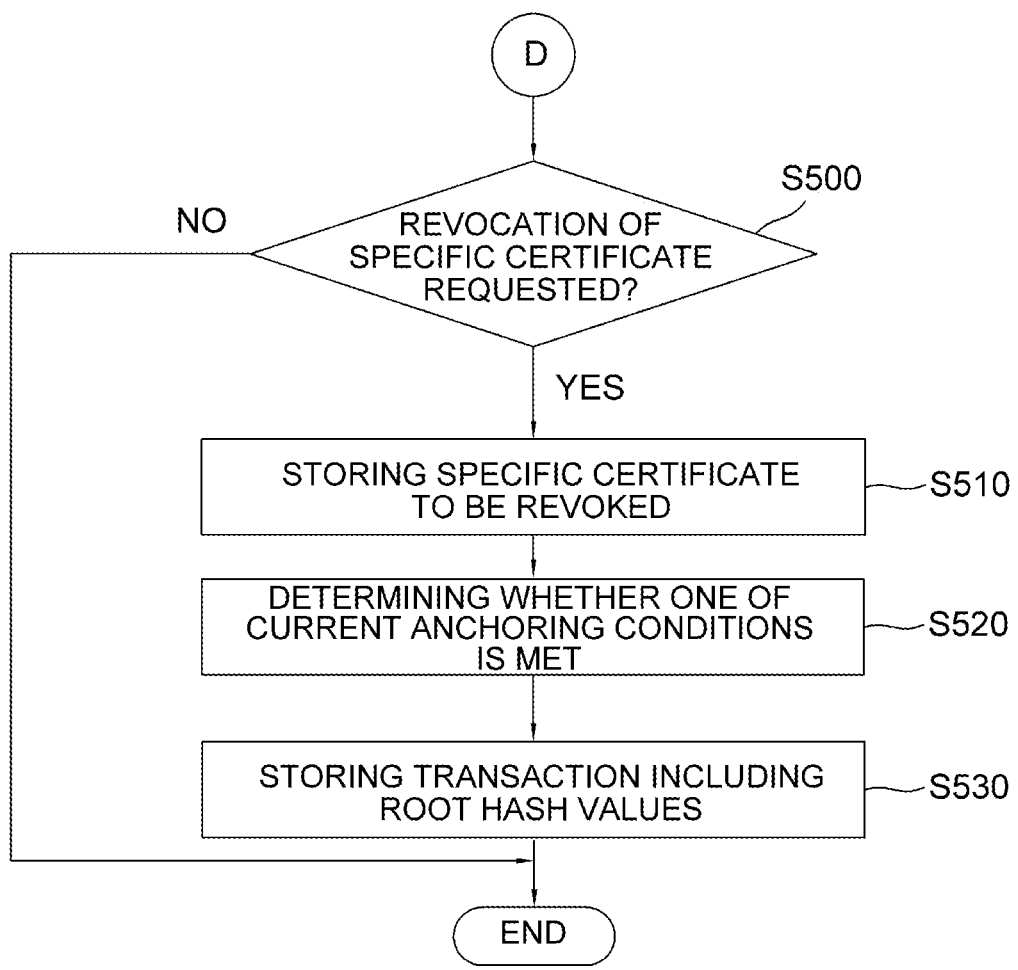

FIGS. 9 to 16 illustrate a method and a system for authenticating the specific certificate based on the blockchain network.

As illustrated, a system for authenticating the specific certificate based on the blockchain network in accordance with the present disclosure may include the specific user device 100, an issuance-requesting server 600, the certificate-managing server 300, the blockchain network 400, and the verification-requesting device 500.

The authentication-requesting server 600 may include a random number generator 630 and a second encrypting engine 640, and may relay a request for an authentication based on the blockchain network by transmitting the specific identification information for the issuance of the specific certificate on the specific user who operates the specific user device 100, in response to the request for the authentication from the specific user device 100.

For this purpose, the authentication-requesting server 600 may include a third DB part 610.

The third DB part 610 may store the specific identification information on the specific user who operates the specific user device 100, and may further include a DB 611 for user identification which stores personal information corresponding to the specific identification information on the specific user used at a time of the issuance. Herein, the specific identification information on the specific user may be information generated by hashing the personal information on the specific user.

Based on the specific: identification information on the specific user transmitted from the authentication-requesting server 600, if the specific certificate is determined as valid, the certificate-managing server 300 may transmit the public key of the specific user to the authentication-requesting server 600.

To perform such functions, the certificate-managing server 300 may include the second DB part 310 and the third hashing engine 320.

First, the second DB part 310 may include the DB 311 for registration information where all of the certificates, all pieces of root hash identification information used for identifying all of the root hash values, and all pieces of node index information, as corresponding to the all pieces of identification information, including (i) each of the hash values corresponding to each of the leaf nodes used for the Merkle tree operation of the root hash values, and (ii) the identification information on each of the users corresponding to each of the leaf nodes, are stored and may include the DB 312 for monitoring forgery where all of the transaction IDs, generated as identifiers every time all of the transactions are created at the certificate-managing server 300, are stored such that each of all of the transaction IDs corresponds to each of all of the root hash values.

Based on this, a process of the certificate-managing server 300 determining whether the specific certificate is valid by referring to the transmitted specific identification information is described as follows.

First, the certificate-managing server 300 may retrieve the specific certificate of the specific user from the DB 311 for registration information by referring to the specific identification information on the specific user transmitted from the authentication-requesting server 600 and may instruct the third hashing engine 320 to hash the specific certificate, to thereby generate the specific hash value for comparison of the specific certificate.

Thereafter, the certificate-managing server 300 may retrieve the specific node index information from the DB 311 for registration information, may acquire the specific hash value for reference in the leaf node corresponding to the specific certificate.

Thereafter, the certificate-managing server 300 may compare the specific hash value for reference with the specific hash value for comparison, and if the two hash values are determined as identical to each other, may determine that the specific certificate is valid.

If the specific hash value for reference and the specific hash value for comparison are determined as not identical to each other, the certificate-managing server 300 may allow a message, representing that the authentication based on the blockchain network is refused, to be transmitted to the specific user device 100.

By these processes, damages to the legitimate users may be minimized by allowing the users to quickly recognize and respond to forgery and preventing illegal use by illegal users via hacking.

Meanwhile, if the specific hash value for reference and the specific hash value for comparison are determined as identical to each other, the certificate-managing server 300 may further retrieve from the DB 311 for registration information the specific root hash identification information which is an identifier for the specific root hash value corresponding to the specific certificate of the specific user.

Thereafter, the certificate-managing server 300 may retrieve from the DB 311 for registration information all of the certificates, corresponding to the specific root hash value for reference, including the specific certificate of the specific user, that is, all of the certificates corresponding to the leaf nodes used for the Merkle tree operation of the specific root hash value for reference, by referring to the retrieved specific root hash identification information, and may instruct the third hashing engine 320 to apply the Merkle tree operation to each of the leaf nodes including each of the hash values for comparison of all of the retrieved certificates, to thereby generate the specific root hash value for comparison.

In addition, the certificate-managing server 300 may retrieve a specific transaction ID from the DB 312 for monitoring forgery by referring to the retrieved specific root hash identification information, and may transmit the specific transaction ID to the blockchain network 400 comprised of the blockchain nodes 410.

Thereafter, at least one of the blockchain nodes 410 on the blockchain network 400 may retrieve the specific transaction from the blockchain network 400, i.e., the distributed database by referring to the specific transaction ID, may extract the specific root hash value for reference included in the retrieved specific transaction, and may transmit the specific root hash value for reference to the certificate-managing server 300.

The certificate-managing server 300 may acquire the specific root hash value for reference, and may compare the acquired specific root hash value for reference with the created specific root hash value for comparison, and if the two hash values are identical, may determine that the specific certificate is legitimate.

Also, if the specific root hash value for reference and the specific root hash value for comparison are not identical, the certificate-managing server 300 may determine that at least one of all of the certificates corresponding to the specific root hash value for comparison is forged, and may perform processes of handling the forgery.

By these processes, the present disclosure provides a method of monitoring forgery of information related to registration of the issued certificate of the user in the certificate-managing server 300 every time the authentication based on the blockchain is requested, and of enabling the user to quickly recognise and respond to the forgery of information related to the registration stored in the certificate-managing server 300.

Thereafter, if the specific certificate is determined as valid and the certificate-managing server 300 transmits a validity-confirming signal including the public key of the specific user, the authentication-requesting server 600 may acquire the validity-confirming signal including the public key and determine whether a protocol used for Internet communications between the specific user devices 100 is HTTP or HTTPS.

Herein, the protocol is used for transfer of hypertext documents between a web server and an Internet browser of a user on the Internet, and includes HTTP (Hypertext Transfer Protocol) and HTTPS (Hypertext Transfer Protocol over Secure Socket Layer) whose difference is whether the documents being transferred are encrypted. That is, the documents are transmitted as plain text in HTTP, and as encrypted text in HTTPS.

Thus, the usage environment of HTTP is vulnerable to hacking, as documents are transferred in plain text.

To resolve the risk of hacking and to authenticate the specific user as a legitimate user of the specific certificate, the authentication-requesting server 600 may instruct the random number generator 630 to generate a random session key if the protocol between the user devices 100 is HTTP.

Thereafter, the authentication-requesting server 600 may instruct the second encrypting engine 640 to encrypt the random session key by using the public key included in the validity-confirming signal, to thereby acquire and transmit an encrypted random session key to the specific user device 100.

The specific user device 100 may instruct the first decrypting engine 160 to decrypt the encrypted random session key by using the private key stored in the memory 120, to acquire the random session key, and perform the authentication of the specific user as the legitimate user.

That is, if the specific user device 100 of the specific user does not have the private key, the decryption cannot be performed and thus the specific user cannot be verified as the legitimate user.

In addition, in the usage environment of HTTP, because the documents are transmitted over a secure communication line between the specific user device 100 and the authentication-requesting server 600 using encryption based on the random session hey provided by the specific user device 100, the leakage of the private key is prevented, even after the user authentication, and the secure authentication based on the blockchain network is performed.

On the other hand, if the protocol is HTTPS, the documents transferred over a communication line between the specific user device 100 and the authentication-requesting server 600 are already encrypted, therefore only thing required is the user authentication.

For this purpose, if the protocol used between the user devices 100 is determined as HTTPS, the authentication-requesting server 600 may instruct the random number generator 630 to generate nonce data and transmit the nonce data to the specific user device 100.

The specific user device 100 may instruct the first hashing engine 140 to generate nonce data hash information for authentication by hashing the nonce data.

Thereafter, the specific user device 100 may instruct the first encrypting engine 130 to generate encrypted nonce data hash information for authentication by using the private key of the specific user stored in the memory 120, and transmit the encrypted nonce data hash information for authentication to the authentication-requesting server 600.

The authentication-requesting server 600 may instruct a fourth hashing engine 620 to hash the nonce data, which have been transmitted to the specific user device 100, to thereby generate nonce data hash information for comparison.

Thereafter, the authentication-requesting server 600 may instruct a second decrypting engine 650 to decrypt the encrypted nonce data hash information for authentication by using the public key of the specific user, to thereby generate the nonce data hash information for authentication, and may confirm if the nonce data hash information for authentication corresponds to the nonce data hash information for comparison, to thereby perform the authentication of the specific user.

Meanwhile, the user may revoke the issued certificate based on the blockchain.

For this purpose, if a request for revocation of the specific certificate is received from the specific user device 100, the certificate-managing server 300 may store the specific certificate to be revoked in the DB 311 for registration information such that the specific: certificate to be revoked corresponds to the specific identification information on the specific user, and may monitor whether one of the current anchoring conditions is satisfied.

Thereafter, if said one of the current anchoring conditions is satisfied, the certificate-managing server 300 may perform a process of generating the specific root hash value for reference by applying the Merkle tree operation to each of leaf nodes respectively including each of hash values of each of the certificates, including the specific certificate to be revoked, stored after the latest previous anchoring condition is satisfied. Herein, the certificate-managing server 300 may generate the specific root hash identification information used for identifying the specific roof hash value for reference, and the Merkle tree information on the root hash values, i.e., specific node index information which includes (i) each of the hash values corresponding to each of the leaf nodes used for the Merkle tree operation of the specific root hash value for reference, and (ii) the identification information on each of the users corresponding to each of the leaf nodes.

Thereafter, the certificate-managing server 300 may generate (i) the specific transaction including the specific root hash value for reference and (ii) the specific transaction ID used as a key value to search for the specific transaction, and transmit the specific transaction to the blockchain network 400 comprised of the blockchain nodes 410.

Herein, on condition that the certain previous root hash value for reference, created right before said one of the current anchoring conditions is satisfied, has been stored in a predetermined leaf node among leaf nodes corresponding to the specific root hash value for reference to be generated and including a hash value of the specific certificate to be revoked, the certificate-managing server 300 may apply the Merkle tree operation to each of the leaf nodes, one of which includes the certain previous root hash value for reference, to thereby generate the specific root hash value for reference. That is, one of the leaf nodes may include the certain previous root hash value for reference created right before said one of the current anchoring conditions is satisfied.

At least one of the blockchain nodes 410 in the blockchain network 400 may store the received specific transaction in the blockchain network 400, i.e., the distributed database in the blockchain nodes 410, to thereby complete the revocation of the specific certificate to be revoked.

Also, the auditors of the certificates who are related to the government institutions may request an audit via the verification-requesting device 500 to confirm whether the information related to the certificates, used by the specific user in accordance with the present disclosure, is forged.

In order to do so, the third DB part 610 of the authentication-requesting server 600 may include the DB 611 for user identification which stores the specific personal information on the specific user who operates the specific user device 100.

Also, the DB 311 for registration information of the certificate-managing server 300 may store the certificates including the specific certificate to be revoked, the specific root hash identification information used for identifying the specific root hash value for reference, and the specific node identification information, including (i) each of the hash values, including the hash value of the specific certificate to be revoked, corresponding to each of the leaf nodes used for the Merkle tree operation of the specific root hash value for reference, and (ii) the identification information on each of the user corresponding to each of the leaf nodes.

For this purpose, the verification-requesting device 500 may transmit a request for monitoring the specific certificate of the specific user to the issuance-requesting server 600.

The authentication-requesting server 600 may retrieve specific identification information on the specific user who requested the monitoring of the specific certificate from the DB 611 for user identification, and transmit the specific identification information to the certificate-managing server 300.

The certificate-managing server 300 may retrieve specific node index information on the specific user from the DB 311 for registration information by referring to the specific identification information on the specific user who requested the monitoring, and may retrieve specific root hash identification information corresponding to the specific user from the DB 311 for registration information.

Thereafter, the certificate-managing server 300 may instruct the third hashing engine 320 to hash all of the certificates, including the specific certificate to be revoked, corresponding to the specific root hash identification information, to thereby generate each of the hash values for comparison of each of the certificates by referring to the specific root hash identification information corresponding to the specific identification information on the specific user, and apply the Merkle tree operation to each of the leaf nodes including each of the hash values for comparison, having the hash value of the specific certificate to be revoked, to thereby generate the specific root hash value for comparison by referring to the specific node index information including each of the hash values for comparison, having the hash value of the specific certificate to be revoked. That is, the certificate-managing server 300 may apply the Merkle tree operation to each of the leaf nodes including each of the hash values for comparison of each of the certificates, including the specific certificate to be revoked, corresponding to the specific root hash identification information, to thereby generate the specific root hash value for comparison, by referring to the specific root hash identification information corresponding to the specific identification information on the specific user.

Also, the certificate-managing server 300 may retrieve the specific transaction ID from the DB 312 for monitoring forgery by referring to the specific root hash identification information corresponding to the specific identification information on the specific user and may transmit the specific transaction ID to the blockchain network 400 comprised of the blockchain nodes 410.

Thereafter, at least one of the blockchain nodes 410 on the blockchain network 400 may retrieve the specific transaction from the blockchain network 400, i.e., the distributed database by referring to the specific transaction ID, and may extract the specific root hash value for reference included in the retrieved specific transaction, and may transmit the specific root hash value for reference to the certificate-managing server 300.

If the specific root hash value for comparison and the transmitted specific root hash value for reference are determined as identical, the certificate-managing server 300 may allow a message, representing that the specific certificate of the specific user is not forged, to be transmitted to the verification-requesting device 500.

On the other hand, if the transmitted specific root hash value for reference and the specific root hash value for comparison are not identical to each other, then the certificate-managing server 300 may compare, for all the leaf nodes, (i) each of hash values of each of the certificates, including the specific certificate to be revoked, in each of the leaf nodes used to calculate the specific root hash value for reference corresponding to the specific hash value for reference, and (ii) its corresponding each of hash values of each of the certificates, including the specific certificate to be revoked, in each of the leaf nodes used to calculate the specific root hash value for comparison corresponding to the specific hash value for comparison, and identify one or more certain leaf nodes, which have different hash values with each other, among all the leaf nodes.

Thereafter, if one of the leaf nodes, which includes one of the different hash values of the specific certificate or one of the different hash values of the specific certificate to be revoked, corresponds to the leaf node of the specific certificate of the specific user, the certificate-managing server 300 may allow a message, representing the specific certificate of the specific user is forged, to be transmitted to the verification-requesting device 500.

Also, if the leaf node including the different hash value of the specific certificate does not correspond to the leaf node of the specific certificate of the specific user, the certificate-managing server 300 may allow a message, representing the specific certificate of the specific user is not forged, to be transmitted to the verification-requesting device 500. Then, the certificate-managing server 300 may determine that at least one of all of the certificates, which include the specific certificate to be revoked, corresponding to the specific root hash value for comparison, as forged, and may perform processes of handling the forgery.

Although the authentication-requesting server 600 and the certificate-managing server 300 are described as separate devices in the above description, a single server, i.e., the authentication-supporting server 2000, may function as the authentication-requesting server 600 and the certificate-managing server 300.

That is, the authentication-supporting server 2000 may perform the authentication based on the blockchain network and may include a communication part (not illustrated) and a processor (not illustrated). Identical reference numerals are for convenience of explanation but not intended for representing sameness of separate devices. Further, according to another example embodiment of the present disclosure, the method may be performed by the authentication-supporting server 2000 or another server of a different configuration. Further, the authentication-supporting server 2000 may be servers corresponding to each of nodes of the blockchain network 400, or may be a server managing each of the node of the blockchain network 400, or may be a transaction server.

Specifically, the authentication-supporting server 2000 typically achieves desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP session, but the scope of the present disclosure is not limited thereto. For example, they could be transmitted and received as UDP datagrams.

Also, the processor of such devices may include hardware configuration of MPU (Micro Processing Unit) or CPU (Central Processing Unit), cache memory, data bus, etc. Additionally, OS and software configuration of applications that achieve specific purposes may be further included.

A process of the authentication of the specific certificate based on the blockchain network by using the system for authenticating the specific certificate based on the blockchain network in accordance with the present disclosure is described as follows.

The specific user may transmit an authentication request for the specific certificate based on the blockchain network by connecting to the authentication-requesting server 600 by using the specific user device 100, at a step of S300.

The authentication-requesting server 600 may retrieve the specific identification information on the specific user from the DB 611 for user identification, in response to the authentication request from the specific user, and may transmit the specific identification information to the certificate-managing server 300, at a step of S310.

The certificate-managing server 300 may determine whether the specific certificate of the specific user is valid by referring to the transmitted specific identification information at a step of S320. First, the certificate-managing server 300 may retrieve the specific certificate of the specific user from the DB 311 for registration information by referring to the specific identification information on the specific user transmitted from the authentication-requesting server 600, may instruct the third hashing engine 320 to hash the specific certificate, to thereby generate the specific hash value for comparison, may retrieve the specific node index information from the DB 311 for registration information by referring to the specific identification information on the specific user, and may acquire the specific hash value for reference in the leaf node corresponding to the specific certificate, at a step of S321.

Then, the certificate-managing server 300 may compare the acquired specific hash value for reference with the specific hash value for comparison, and may determine if the two hash values are identical to each other, at a step of S322.

Herein, if the specific hash value for reference and the specific hash value for comparison are determined as not identical to each other, the certificate-managing server 300 may allow a message, representing that the authentication based on the blockchain network is refused, to be transmitted to the specific user device 100.

On the other hand, if the specific hash value for reference and the specific hash value for comparison are determined as identical to each other, the certificate-managing server 300 may further retrieve from the DB 311 for registration information the specific root hash identification information which is an identifier for the specific root hash value for reference corresponding to the specific certificate of the specific user.

Thereafter, the certificate-managing server 300 may retrieve, from the DB 311 for registration information, all of the certificates, corresponding to the specific root hash value for reference, including the specific certificate of the specific user, that is, all of the certificates corresponding to each of the leaf nodes used for the Merkle tree operation of the specific root hash value for reference, by referring to the retrieved specific root hash identification information, and may instruct the third hashing engine 320 to apply the Merkle tree operation to each of the leaf nodes including each of the hash values for comparison of all of the retrieved certificates, to thereby generate the specific root hash value for comparison at a step of S325.

Thereafter, the certificate-managing server 300 may retrieve the specific transaction ID from the DB 312 for monitoring forgery by referring to the retrieved specific root hash identification information, and may transmit the specific transaction ID to the blockchain network 400 comprised of the blockchain nodes 410 at a step of S326.

Thereafter, at least one of the blockchain nodes 410 on the blockchain network 400 may retrieve the specific transaction from the blockchain network 400, i.e., the distributed database by referring to the specific transaction ID, may extract the specific roof hash value for reference included in the retrieved specific transaction, and may transmit the specific root hash value for reference to the certificate-managing server 300 at a step of S327.

Thereafter, the certificate-managing server 300 may receive the specific root hash value for reference, and may compare the specific root hash value for reference with the specific root hash value for comparison, to thereby determine whether the two hash values are identical to each other, at a step of S328.

Herein, if the specific root hash value for reference and the specific roof hash value for comparison are determined as not identical, the certificate-managing server 300 may determine that at least one of all of the certificates, corresponding to the specific root hash value for comparison, as forged at a step of S329, and may perform processes of handling the forgery.

On the other hand, if the specific root hash value for reference and the specific root hash value for comparison are determined as identical, the certificate-managing server 300 may determine that the specific certificate is legitimate.

Thus, the certificate-managing server 300 may retrieve the public key of the specific user from the DB 311 for registration information by referring to the specific identification information on the specific user, and may transmit the public key to the authentication-requesting server 600, at a step of S330.

The authentication-requesting server 600 may acquire the public key and authenticate the specific user of the specific user device 100 based on the acquired public key, at a step of S3400 as follows.

First, the authentication-requesting server 600 may determine whether the protocol used for Internet communications of the specific user device 100 requesting the authentication is HTTP or HTTPS, at a step of S340.

If the protocol between the specific user devices 100 is HTTP, the authentication-requesting server 600 may instruct the random number generator 630 to generate a random session key, at a step of S350.

Then, the authentication-requesting server 600 may instruct the second encrypting engine 640 to encrypt the random session key by using the public key of the specific user, to thereby generate and transmit an encrypted random session key to the specific user device 100, at a step of S360.

The specific user device 100 may acquire the encrypted random session key, instruct the first decrypting engine 160 to decrypt the encrypted random session key by using the private key of the specific user stored in the memory 120, and to acquire the random session key, and may complete the authentication of the specific user, at a step of S370.

Then, if the protocol of the specific user device 100 requesting the authentication is HTTPS, the authentication-requesting server 600 may instruct the random number generator 630 to generate nonce data and transmit the nonce data to the specific user device 100, at a step of S380.

The specific user device 100 may instruct the first hashing engine 140 to generate nonce data hash information for authentication by hashing the nonce data, at a step of S390.

Thereafter, the specific user device 100 may instruct the first encrypting engine 130 to acquire encrypted nonce data hash information for authentication by using the private key of the specific user stored in the memory 120, and transmit the encrypted nonce data hash information for authentication to the authentication-requesting server 600, at a step of S400.

The authentication-requesting server 600 may instruct the fourth hashing engine 620 to hash the nonce data, which have been transmitted to the specific user device 100, to acquire nonce data hash information for comparison, may instruct the second decrypting engine 650 to decrypt the encrypted nonce data hash information for authentication by using the public key of the specific user to acquire the nonce data hash information for authentication, and may confirm if the nonce data hash information for authentication is identical to the nonce data hash information for comparison, to thereby perform the authentication of the specific user, at a step of S410.

Meanwhile, the user may revoke the issued certificate-based on the blockchain.

For this purpose, the certificate-managing server 300 may determine if a request for revocation of a specific certificate to be revoked is acquired from the specific user device 100 at a step of S500, and if the request is acquired, may store the specific certificate to be revoked in the DB 311 for registration information such that the specific certificate to be revoked corresponds to the specific identification information on the specific user at a step of S510, and may monitor whether one of the current anchoring conditions is satisfied at a step of S520.

Then, if said one of the current anchoring conditions is satisfied, the certificate-managing server 300 may perform a process of generating the specific root hash value for reference by applying the Merkle tree operation to each of leaf nodes respectively including each of hash values of each of the certificates, including the specific certificate to be revoked, stored after the latest previous anchoring condition is satisfied. Herein, the certificate-managing server 300 may generate all pieces of the root hash identification information used for identifying all of the root hash values, and the Merkle tree information on all of the root hash values, i.e., all pieces of node index information which include (i) each of the hash values corresponding to each of the leaf nodes used for the Merkle tree operation of all of the root hash values, and (ii) all of the identification information on each of the users corresponding to each of the leaf nodes.

Thereafter, the certificate-managing server 300 may generate (i) the transaction including the root hash values and (ii) the transaction ID used as a key value to search the transaction, and transmit the transaction to the blockchain network 400 comprised of the blockchain nodes 410.

Herein, on condition that the certain previous root hash value for reference, created right before said one of the current anchoring conditions is satisfied, has been stored in a predetermined leaf node among leaf nodes corresponding to the specific root hash value for reference to be generated and including a hash value of the specific certificate to be revoked, the certificate-managing server 300 may apply the Merkle tree operation to each of the leaf nodes, one of which includes the certain previous root hash values for reference, to thereby generate the specific root hash value for reference. That is, one of the leaf nodes may include the certain previous root hash value for reference created right before said one of the current anchoring conditions is satisfied.

At least one of the blockchain nodes 410 in the blockchain network 400 may store the acquired specific transaction in the blockchain network 400, i.e., the distributed database in the blockchain nodes 410 at a step of S530, to thereby complete the revocation.

As a result, the specific user may be allowed to confirm the revocation of the specific certificate to be revoked.

Further, the auditors who audit an individual user or the specific certificate may request the audit via the verification-requesting device 500 to confirm whether information related to the specific certificate is forged.

That is, the authentication-requesting server 600 may determine whether the verification-requesting device 500 requested monitoring of the specific certificate at a step of S600, and if the monitoring is determined as requested, the specific identification information of the specific user whose certificate is the subject of the requested monitoring may be retrieved from the DB 211 for user identification, and the specific identification information may be transmitted to the certificate-managing server 300 at a step of S610.

The certificate-managing server 300 may retrieve specific node index information on the specific user from the DB 311 for registration information by referring to the specific identification information on the specific user who requested the monitoring, and may retrieve the specific root hash identification information corresponding to the specific user from the DB 311 for registration information, at a step of S620.

Thereafter, the certificate-managing server 300 may hash all of the certificates corresponding to the specific root hash identification information by referring to the retrieved specific root hash identification information, to thereby generate the hash values for comparison. Herein, said all of the certificates may include the specific certificate to be revoked. Then, on condition that each of the hash values for comparison has been allocated to each of its corresponding leaf nodes by referring to the specific node index information, the certificate-managing server 300 may instruct the third hashing engine 320 to apply the Merkle tree operation to each of the hash values for comparison, to thereby generate the specific root hash value for comparison at a step of S630.

That is, the certificate-managing server 300 may apply the Merkle tree operation to each of the leaf nodes including each of the hash values for comparison of each of the certificates corresponding to the specific root hash identification information, to thereby generate the specific root hash value for comparison, by referring to specific root hash identification information corresponding to the specific identification information on the specific user.

Thereafter, the certificate-managing server 300 may retrieve the specific transaction ID from the DB 312 for monitoring forgery by referring to the specific root hash identification information corresponding to the specific identification information on the specific user and may transmit the specific transaction ID to the blockchain network 400 comprised of the blockchain nodes 410, at a step of S640.

At least one of the blockchain nodes 410 on the blockchain network 400 may retrieve the specific transaction from the blockchain network 400, i.e., the distributed database by referring to the specific transaction ID, and may extract the specific root hash value for reference included in the retrieved specific transaction, and may transmit the specific root hash value for reference to the certificate-managing server 300, at a step of S650.

Thereafter, the certificate-managing server 300 may acquire the specific root hash value for reference, and may compare the specific root hash value for reference with the specific root hash value for comparison, to thereby determine whether the two hash values are identical to each other, at a step of S660.

Herein, if the specific root hash value for comparison and the specific root hash value for reference are determined as identical, the certificate-managing server 300 may allow a message, representing that the specific certificate is not forged, to be transmitted to the verification-requesting device 500, at a step of S670.

On the other hand, if the specific root hash value for reference and the specific root hash value for comparison are not identical to each other, then the certificate-managing server 300 may compare, for all the leaf nodes, (i) each of hash values of each of the certificates in each of the leaf nodes used to calculate the specific root hash value for reference corresponding to the specific hash value for reference, and (ii) its corresponding each of hash values of each of the certificates in each of the leaf nodes used to calculate the specific root hash value for comparison corresponding to the specific hash value for comparison, and identify one or more certain leaf nodes, which have different hash values with each other, among all the leaf nodes, at as step of S661.

Thereafter, the certificate-managing server 300 may determine whether one of the leaf nodes including the different hash value corresponds to the specific certificate of the specific user at a step of S662, and if said one of the leaf nodes corresponds to the specific certificate, the certificate-managing server 300 may allow a message, representing the specific certificate of the specific user is forged, to be transmitted to the verification-requesting device 500 at a step of S663. Then, the certificate-managing server 300 may determine that at least one of all of the certificates, corresponding to the specific root hash value for comparison, as forged at a step of S665, and may perform processes of handling the forgery.

Also, if the leaf node including the different hash value does not correspond to the specific user, the certificate-managing server 300 may allow a message, representing the specific certificate of the specific user is not forged, to be transmitted to the verification-requesting device 500 at a step of S664.

Although the issuance-requesting server 200 and the certificate-managing server 300 are described as linked with each other to perform the authentication based on the blockchain network in the above description, a single server, i.e., the authentication-supporting server 2000, may perform the authentication based on the blockchain network.

That is, if the authentication request, including the specific personal information on the specific user, of the specific certificate is acquired at steps of S300 and S310, the authentication-supporting server 2000 may determine whether the specific certificate is valid by referring to the specific identification information on the specific user corresponding to the specific personal information on the specific user at a step of S320, and if the specific certificate is determined as valid, may perform the authentication of the specific user via communication with the specific user device 100 by using the public key corresponding to the specific identification information on the specific user at steps of S330 and S340.

Herein, one can easily understand confirmation of the validity of the certificates, the authentication of the specific user, etc. by referring to the description of the certificate-managing server 300 above.

Also, the authentication-supporting server 2000 may perform the revocation and monitoring of the specific certificate, as the methods mentioned above.

The present disclosure has an effect of reducing a cost to construct the system for issuing the specific certificate which is linked with a top-grade security system to block hacking as much as possible, due to the fact that the public key for the specific certificate, which requires constant maintenance, is saved and managed on the blockchain through a peer-to-peer (P2P) network based distributed database instead of being saved and managed on a certificate authority (CA) operating server, of reducing system related costs such as operation and maintenance cost of the constructed system for issuing the specific certificate based on the blockchain network, and of greatly reducing an issuing cost of the specific certificate.

The present disclosure has another effect of grouping the specific user's public keys for the specific certificate as many as the predetermined number, compressing the grouped public keys, and registering transaction information that includes the grouped public keys list in order to minimize the network traffics, to thereby also minimize the network overload while registering the transaction information in the blockchain network, in the process of issuing the specific certificate.

The present disclosure has still another effect of performing an authentication process of the specific certificate based on the blockchain network without exposure of the public key of the specific user when issuing the specific certificate by preventing the specific user's public key from being registered in the blockchain network, and of monitoring forgery and falsification of authentication related information that includes the public key of the specific user.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for authenticating a specific user by using certificates including a specific certificate of the specific user based on a blockchain network, comprising steps of:
   (a) determining, by an authentication-supporting server, that a specific transaction is stored in a distributed blockchain on the blockchain network between a previous anchoring condition for registering transactions in the blockchain network and one of current anchoring conditions for registering transactions in the blockchain network, wherein the specific transaction includes a specific root hash value for reference created by applying a Merkle tree operation to each of a plurality of leaf nodes of a Merkle tree of the distributed blockchain, each of the plurality of leaf nodes comprising, specific root hash identification information corresponding to the specific root hash value for reference, and a specific transaction ID representing a location of the specific transaction on the distributed blockchain, wherein each of the certificates comprises public keys of each of a plurality of users including the specific user, wherein each of the certificates are stored in the authentication-supporting server as corresponding to specific identification information on the specific user;
   (b) confirming, by the authentication-supporting server, a validity of the specific certificate of the specific user stored as corresponding to the specific identification information on the specific user based on a determination that an authentication request of the specific user includes the specific identification information on the specific user and is acquired from a specific user device; and
   (c) performing, by the authentication-supporting server, an authentication of the specific user by using the specific certificate based on the confirming of the specific certificate as valid.

2. The method of claim 1, wherein, the step of (a) further comprising, the authentication-supporting server (i) confirming the specific root hash identification information corresponding to the specific identification information on the specific user, (ii) generating a specific root hash value for comparison, corresponding to the specific root hash identification information, by applying the Merkle tree operation to each of the plurality of leaf nodes including each of hash values for comparison of the certificates, (iii) confirming the specific transaction ID corresponding to the specific root hash identification information, (iv) retrieving the specific transaction from the distributed blockchain by referring to the specific transaction ID and extracts the specific root hash value for reference from the specific transaction, and (v) determining whether the specific root hash value for comparison and the specific root hash value for reference are identical, to thereby confirm that the specific certificate is valid.

3. The method of claim 2, wherein, the authentication-supporting server, based on a determination that the specific root hash value for comparison and the specific root hash value for reference are determined as not identical, further performs comparing (i) a specific hash value for reference in a specific leaf node which is a descendant of a root node including the specific root hash value for reference corresponding to the specific user, and (ii) a specific hash value for comparison in the specific leaf node which is a descendant of a root node including the specific root hash value for comparison, to thereby confirm that the specific certificate is valid.

4. The method of claim 2, wherein, the authentication-supporting server further performs, before confirming the specific root hash identification information corresponding to the specific identification information on the specific user, (i) generating a specific hash value for comparison by hashing the specific certificate corresponding to the specific identification information on the specific user, and (ii) determining whether a specific hash value for reference of the specific certificate corresponding to the specific identification information on the specific user is identical to the specific hash value for comparison, to thereby confirm that the specific certificate is valid.

5. The method of claim 1, wherein, the step of (c) further comprising, based on a determination that a communication protocol between the authentication-supporting server and the specific user device is an HTTP, the authentication-supporting server (i) generating a random session key, (ii) encrypting the random session key using a public key of the specific user included in the specific certificate to thereby generate an encrypted random session key, and (iii) transmitting the encrypted random session key to the specific user device, to thereby instruct the specific user device to decrypt the encrypted random session key by using a private key of the specific user stored in the specific user device to perform the authentication of the specific user.

6. The method of claim 1, wherein, the step of (c) further comprising, based on a determination that a communication protocol between the authentication-supporting server and the specific user device is an HTTPS, the authentication-supporting server (i) generating nonce data and transmit the nonce data to the specific user device, (ii) instructing the specific user device to perform (ii-1) hashing the nonce data to thereby generate nonce data hash information for reference, (ii-2) generating encrypted nonce data hash information for reference by using a private key of the specific user stored in the specific user device, and (ii-3) transmitting the encrypted nonce data hash information for reference to the authentication-supporting server, (iii) decrypting the encrypted nonce data hash information for reference by using a public key of the specific user included in the specific certificate, to thereby acquire the nonce data hash information for reference, and (iv) determining whether the nonce data hash information for reference is identical to nonce data hash information for comparison created by hashing the nonce data, to thereby confirm that the specific user is authenticated.

7. A method for authenticating a specific user by using certificates including a specific certificate of the specific user based on a blockchain network, comprising steps of:
  (a) confirming, by a certificate-managing server, a validity of a specific certificate of a specific user stored as corresponding to specific identification information on the specific user, based that a specific transaction is stored in a distributed blockchain on the blockchain network between a previous anchoring condition for registering transactions in the blockchain network and one of current anchoring conditions for registering transactions in the blockchain network, wherein the specific transaction includes a specific root hash value for reference created by applying a Merkle tree operation to each of a plurality of leaf nodes of a Merkle tree of the distributed blockchain, each of the plurality of leaf nodes comprising hash values for reference of each of the certificates, specific root hash identification information corresponding to the specific root hash value for reference, and a specific transaction ID representing a location of the specific transaction on the distributed blockchain, wherein each of the certificates comprises public keys of each of a plurality of users including the specific user, wherein each of the certificates are stored in the certificate-managing server as corresponding to specific identification information on the specific user, and that an authentication request of the specific user including the specific identification information on the specific user is acquired from an authentication-requesting server; and
  (b) transmitting, by the certificate-managing server, based on the confirmation that the specific certificate is determined as valid, the specific certificate to the authentication-requesting server, to thereby instruct the authentication-requesting server to perform an authentication of the specific user by using the specific certificate.

8. The method of claim 7, wherein, the step of (a) further comprising, the certificate-managing server (i) confirming the specific root hash identification information corresponding to the specific identification information on the specific user, (ii) generating a specific root hash value for comparison, corresponding to the specific root hash identification information, by applying the Merkle tree operation to each of the plurality of leaf nodes including each of hash values for comparison of the certificates, (iii) confirming the specific transaction ID corresponding to the specific root hash identification information, (iv) retrieving the specific transaction from the distributed blockchain by referring to the specific transaction ID and extracts the specific root hash value for reference from the specific transaction, and (v) determining whether the specific root hash value for comparison and the specific root hash value for reference are identical, to thereby confirm that the specific certificate is valid.

9. The method of claim 8, wherein, the certificate-managing server further performs, based on a determination that the specific root hash value for comparison and the specific root hash value for reference are determined as not identical, comparing (i) a specific hash value for reference in a specific leaf node which is a descendant of a root node including the specific root hash value for reference corresponding to the specific user, and (ii) a specific hash value for comparison in the specific leaf node which is a descendant of a root node including the specific root hash value for comparison, to thereby confirm that the specific certificate is valid.

10. The method of claim 8, wherein, the certificate-managing server further performs, before confirming the specific root hash identification information corresponding to the specific identification information on the specific user, (i) generating a specific hash value for comparison by hashing the specific certificate corresponding to the specific identification information on the specific user, and (ii) determining whether a specific hash value for reference of the specific certificate corresponding to the specific identification information on the specific user is identical to the specific hash value for comparison, to thereby confirm that the specific certificate is valid.

11. The method of claim 7, wherein, at the step of (b), the certificate-managing server further performs transmitting the specific certificate to the authentication-requesting server, to thereby instruct the authentication-requesting server, based on a determination that a communication protocol between the authentication-supporting server and the specific user device is an HTTP, (i) to generate a random session key, (ii) to encrypt the random session key using a public key of the specific user included in the specific certificate to thereby generate an encrypted random session key, and (iii) to transmit the encrypted random session key to the specific user device, to thereby instruct the specific user device (iii-1) to decrypt the encrypted random session key by using a private key of the specific user stored in the specific user device to perform the authentication of the specific user.

12. The method of claim 7, wherein, at the step of (b), the certificate-managing server further performs transmitting the specific certificate to the authentication-requesting server, to thereby instruct the authentication-requesting server, based on a determination that a communication protocol between the authentication-requesting server and the specific user device is an HTTPS, (i) to generate nonce data and transmit the nonce data to the specific user device, (ii) to instruct the specific user device to (ii-1) hash the nonce data to thereby generate nonce data hash information for reference, (ii-2) generate encrypted nonce data hash information for reference by using a private key of the specific user stored in the specific user device, and (ii-3) transmit the encrypted nonce data hash information for reference to the authentication-supporting server, (iii) to decrypt the encrypted nonce data hash information for reference by using a public key of the specific user included in the specific certificate, to thereby acquire the nonce data hash information for reference, and (iv) determines whether the nonce data hash information for reference is identical to nonce data hash information for comparison created by hashing the nonce data, to thereby confirm that the specific user is authenticated.

13. An authentication-supporting server for authenticating a specific user by using certificates including a specific certificate of the specific user based on a blockchain network, comprising:
  circuitry configured to acquire, based on a determination that a specific transaction is stored in a distributed blockchain on the blockchain network between a previous anchoring condition for registering transactions in the blockchain network and one of current anchoring conditions for registering transactions in the blockchain network, wherein the specific transaction includes a specific root hash value for reference created by applying a Merkle tree operation to each of a plurality of leaf nodes of a Merkle tree of the distributed blockchain, each of the plurality of leaf nodes comprising hash values for reference of each of the certificates, specific root hash identification information corresponding to the specific root hash value for reference, and a specific transaction ID representing a location of the specific transaction on the distributed blockchain, wherein each of the certificates comprises public keys of each of a plurality of users including the specific user, wherein each of the certificates are stored in the authentication-supporting server as corresponding to specific identification information on the specific user, an authentication request of the specific user including the specific identification information on the specific user from a specific user device; and a processor configured to confirm (I) a validity of the specific certificate of the specific user stored as corresponding to the specific identification information on the specific user, and (II) perform an authentication of the specific user by using the specific certificate based on the confirming of the specific certificate as valid.

14. The authentication-supporting server of claim 13, wherein, at the process of (I), the processor is further configured to (i) confirm the specific root hash identification information corresponding to the specific identification information on the specific user, (ii) generate a specific root hash value for comparison, corresponding to the specific root hash identification information, by applying the Merkle tree operation to each of the plurality of leaf nodes including each of hash values for comparison of the certificates, (iii) confirm the specific transaction ID corresponding to the specific root hash identification information, (iv) retrieve the specific transaction from the distributed blockchain by referring to the specific transaction ID and extracts the specific root hash value for reference from the specific transaction, and (v) determine whether the specific root hash value for comparison and the specific root hash value for reference are identical, to thereby confirm that the specific certificate is valid.

15. The authentication-supporting server of claim 14, wherein, the processor, based on a determination that the specific root hash value for comparison and the specific root hash value for reference are determined as not identical, is further configured to compare (i) a specific hash value for reference in a specific leaf node which is a descendant of a root node including the specific root hash value for reference corresponding to the specific user, and (ii) a specific hash value for comparison in the specific leaf node which is a descendant of a root node including the specific root hash value for comparison, to thereby confirm that the specific certificate is valid.

16. The authentication-supporting server of claim 14, wherein, the processor is further configured to, before confirming the specific root hash identification information corresponding to the specific identification information on the specific user, (i) generate a specific hash value for comparison by hashing the specific certificate corresponding to the specific identification information on the specific user, and (ii) determine whether a specific hash value for reference of the specific certificate corresponding to the specific identification information on the specific user is identical to the specific hash value for comparison, to thereby confirm that the specific certificate is valid.

17. The authentication-supporting server of claim 13, wherein, at the process of (II), based on a determination that a communication protocol between the authentication-supporting server and the specific user device is an HTTP, the processor is further configured to (i) generate a random session key, (ii) encrypt the random session key using a public key of the specific user included in the specific certificate to thereby generate an encrypted random session key, and (iii) transmit the encrypted random session key to the specific user device, to thereby instruct the specific user device to decrypt the encrypted random session key by using a private key of the specific user stored in the specific user device to perform the authentication of the specific user.

18. The authentication-supporting server of claim 13, wherein, at the process of (II), based on a determination that a communication protocol between the authentication-supporting server and the specific user device is an HTTPS, the processor is further configured to (i) generate nonce data and transmit the nonce data to the specific user device, (ii) instruct the specific user device to (ii-1) hash the nonce data to thereby generate nonce data hash information for reference, (ii-2) generate encrypted nonce data hash information for reference by using a private key of the specific user stored in the specific user device, and (ii-3) transmit the encrypted nonce data hash information for reference to the authentication-supporting server, (iii) decrypt the encrypted nonce data hash information for reference by using a public key of the specific user included in the specific certificate, to thereby acquire the nonce data hash information for reference, and (iv) determine whether the nonce data hash information for reference is identical to nonce data hash information for comparison created by hashing the nonce data, to thereby confirm that the specific user is authenticated.

19. A certificate-managing server for authenticating a specific user by using certificates including a specific certificate of the specific user based on a blockchain network, comprising:

circuitry configured to, based on a determination that a specific transaction is stored in a distributed blockchain on the blockchain network between a previous anchoring condition for registering transactions in the blockchain network and one of current anchoring conditions for registering transactions in the blockchain network, wherein the specific transaction includes a specific root hash value for reference created by applying a Merkle tree operation to each of a plurality of leaf nodes of a Merkle tree of the distributed blockchain, each of the plurality of leaf nodes comprising hash values for reference of each of the certificates, specific root hash identification information corresponding to the specific root hash value for reference, and a specific transaction ID representing a location of the specific transaction on the distributed blockchain, wherein each of the certificates comprises public keys of each of a plurality of users including the specific user, wherein each of the certificates are stored in the certificate-managing server as corresponding to specific identification information on the specific user, acquire an authentication request of the specific user including the specific identification information on the specific user from an authentication-requesting server; and a processor configured to (I) confirm a validity of the specific certificate of the specific user stored as corresponding to the specific identification information on the specific user, and (II) transmit, based on the confirmation that the specific certificate is determined as valid, the specific certificate to the authentication-requesting server, to thereby instruct the authentication-requesting server to perform an authentication of the specific user by using the specific certificate.

20. The certificate-managing server of claim 19, wherein, at the process of (I), the processor is further configured to (i) confirm the specific root hash identification information corresponding to the specific identification information on the specific user, (ii) generate a specific root hash value for comparison, corresponding to the specific root hash identification information, by applying the Merkle tree operation to each of the plurality of leaf nodes including each of hash values for comparison of the certificates, (iii) confirm the specific transaction ID corresponding to the specific root hash identification information, (iv) retrieve the specific transaction from the distributed blockchain by referring to the specific transaction ID and extracts the specific root hash value for reference from the specific transaction, and (v) determine whether the specific root hash value for comparison and the specific root hash value for reference are identical, to thereby confirm that the specific certificate is valid.

21. The certificate-managing server of claim 20, wherein, the processor is further configured to, based on a determination that the specific root hash value for comparison and the specific root hash value for reference are determined as not identical, compare (i) a specific hash value for reference in a specific leaf node which is a descendant of a root node including the specific root hash value for reference corresponding to the specific user, and (ii) a specific hash value for comparison in the specific leaf node which is a descendant of a root node including the specific root hash value for comparison, to thereby confirm that the specific certificate is valid.

22. The certificate-managing server of claim 20, wherein, the processor is further configured to, before confirming the specific root hash identification information corresponding to the specific identification information on the specific user, (i) generate a specific hash value for comparison by hashing the specific certificate corresponding to the specific identification information on the specific user, and (ii) determine whether a specific hash value for reference of the specific certificate corresponding to the specific identification information on the specific user is identical to the specific hash value for comparison, to thereby confirm whether the specific certificate is valid.

23. The certificate-managing server of claim 19, wherein, at the process of (II), the processor is further configured to transmit the specific certificate to the authentication-requesting server, to thereby instruct the authentication-requesting server, based on a determination that a communication protocol between the authentication-supporting server and the specific user device is an HTTP, (i) to generate a random session key, (ii) to encrypt the random session key using a public key of the specific user included in the specific certificate to thereby generate an encrypted random session key, and (iii) to transmit the encrypted random session key to the specific user device, to thereby instruct the specific user device (iii-1) to decrypt the encrypted random session key by using a private key of the specific user stored in the specific user device to perform the authentication of the specific user.

24. The certificate-managing server of claim 19, wherein, at the process of (II), the processor is further configured to transmit the specific certificate to the authentication-requesting server, to thereby instruct the authentication-requesting server, based on a determination that a communication protocol between the authentication-requesting server and the specific user device is an HTTPS, (i) to generate nonce data and transmit the nonce data to the specific user device, (ii) to instruct the specific user device to (ii-1) hash the nonce data to thereby generate nonce data hash information for reference, (ii-2) generate encrypted nonce data hash information for reference by using a private key of the specific user stored in the specific user device, and (ii-3) transmit the encrypted nonce data hash information for reference to the authentication-supporting server, (iii) to decrypt the encrypted nonce data hash information for reference by using a public key of the specific user included in the specific certificate, to thereby acquire the nonce data hash information for reference, and (iv) determines whether the nonce data hash information for reference is identical to nonce data hash information for comparison created by hashing the nonce data, to thereby confirm whether that the specific user is authenticated.

* * * * *